3,306,822
ANTI-INFLAMMATORY THERAPY WITH
3-INDOLINYL COMPOUNDS
Tsung-Ying Shen, Westfield, N.J., assignor to Merck &
Co., Inc., Rahway, N.J., a corporation of New Jersey
No Drawing. Filed May 20, 1963, Ser. No. 281,813
4 Claims. (Cl. 167—65)

This application is a continuation-in-part of our copending application, Serial No. 164,615, filed January 5, 1962, now abandoned, which was in turn a continuation-in-part of Serial No. 97,434, filed on March 22, 1961, now abandoned.

This invenion relates to a new method of treating inflammation and to certain chemical compounds for such treatment. More specifically, this invention relates to the treatment of inflammation with 3-indolinyl aliphatic acids having a 1-aroyl or heteroaroyl substituent. More specifically also, it relates to a preferred new class of compounds for treating inflammation in which the said 1-aroyl or heteroaroyl substituent carries at least one functional substituent.

The compounds used to treat inflammation in the general method of this invention have the formula:

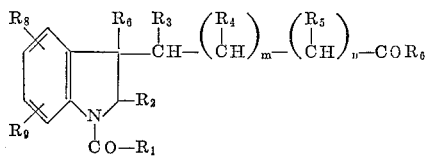

in which $R_1$ may be aromatic, aralkenyl, arylamino, or aryloxy, $R_2$ may be hydrogen, alkyl or aryl, $R_3$ and $R_4$ each may be hydrogen or alkyl, $R_5$ may be hydrogen, amino or hydroxyl, $R_6$ may be hydroxyl, alkoxy, aryloxy, aralkoxy, dialkylaminoalkoxy, amino, hydroxyalkylamino, morpholino, alkylamino, arylamino, aralkylamino, diarylamino, diaralkylamino and OM where M is a cation, $m$ and $n$ each may be 0 or 1, $n$ being 0 when $m$ is 0; $R_7$ may be hydrogen or alkyl and $R_8$ and $R_9$ each may be a further substituent.

The invention also includes as a separate embodiment certain preferred compounds for use in the treatment of inflammation. Such compounds have the structure:

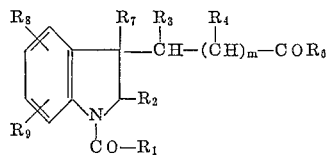

in which $R_1$ may be aromatic aralkenyl or aryloxy, $R_2$ may be hydrogen, alkyl or aryl, $R_3$ and $R_4$ each may be hydrogen or alkyl, $R_6$ may be hydroxyl, alkoxy, aryloxy, aralkoxy, dialkylaminoalkoxy, amino, hydroxyalkylamino, morpholino, alkylamino, arylamino, aralkylamino, diarylamino, diaralkylamino and OM where M is a cation, $m$ may be 0 or 1 when $m$ is 0, $R_7$ may be hydrogen or alkyl and $R_8$ and $R_9$ each may be a further substituent.

In the preferred compounds of the invention, $R_8$ and $R_9$ are hydrogen, a lower alkyl, lower alkoxy, halogen, nitro, aralkyloxy, alkenyloxy, alkylthio, aralkylthio alkylsulfonyl, amino or substituted amino. Examples of the alkyls, aralkyloxy and alkoxys are methyl, ethyl, propyl, t-butyl, methoxy, ethoxy, i-propoxy, benzloxy and the like. $R_8$ and $R_9$ are not limited to this class of substituents, however, and may, if desired, represent substituents such as aryl, aryloxy, hydroxy, mercapto, halo, pseudohalo such as $CF_3$, $CHF_2$ or other haloalkyls, nitro, amino, alkylamino, acylamino, haloalkyl, cyano, sulfamyl, sulfoxide, amino-methyl, substituted amino methyl, carboxy and carboalkoxy groups.

A critical feature of the compounds used in the method of this invention is the presence of an aroyl or heteroaroyl radical attached to the N–1 position of the indoline ring. These acyl groups in the preferred compounds which form an additional embodiment of this invention, are further substituted in the aromatic ring with functional substituents. Thus, suitable aroyl substituents are the benzoyl and naphthoyl groups. The aromatic rings of such groups may contain, and in the preferred compounds do contain at least one functional substituent. This substituent may be a hydroxy or an etherified hydroxy (hydrocarbonoxy) group such as a lower alkoxy, e.g. methoxy, ethoxy, isopropoxy, allyloxy, propoxy, an aryloxy or aralkoxy group, e.g. phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g. benzylthio and phenylthio. The N–1 aroyl radical may be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces the use of compounds wherein the aroyl radical contains a sulfamyl, benzylthiomethyl, cyano, sulfonamido or dialkylsulfonamido radical. Further, the aroyl group may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the most preferred type of compound included within the new compounds in this invention, the N–1 aroyl radical is benzoyl and the functional substituent is in the para position of the six-membered ring.

Alternatively, the N–1 group may be a heteroaryl substituent, and more precisely a heteroaroyl substituent of the formula

where Het represents a five- or six-membered heteroaromatic ring, preferably of less than three fused rings. Examples of such radicals are the furyl, thienyl, pyrryl, thiazolyl, thiadiazolyl, pyrazinyl, pyridyl, alkylpyridyl, pyrazolyl, imidazolyl, oxazolyl, pyrimidinyl and isoxazolyl rings.

The 3-indolinyl aliphatic acids used in the method described herein are preferably lower aliphatic acids such as 3-indolinyl derivatives of acetic, propionic, butyric, valeric, β-halopropionic, acrylic, 4-pentenoic acid and like acids with no more than three carbons separating the carbonyl and the indoline ring, and preferably, no more than two. When three carbons separate the indoline rings and the carboxyl, the carbon next to the carbonyl may carry an amino or hydroxyl group. Esters, salts and amides of such aliphatic acids are also usable in the invention. The esters are important intermediates in the synthesis of the free acids, and in many cases are themselves of importance as end products. Among the preferred esters are the lower alkyl esters such as the methyl, ethyl, propyl or t-butyl compounds, the phenyl, the benzyl, the p-halobenzyl, dialkylaminoalkyl and like esters having less than nine carbon atoms.

The salts of these new 1-aroyl or heteroaroyl-3-indolinyl-lower aliphatic acids can be obtained by treatment of the free acid with base under mild conditions. In this manner there may be obtained alkali metal salts such as the sodium and potassium, the aluminum or magnesium salts or salts of alkaline earth metals, examples of which are barium and calcium. Salts of organic amines such as dimethylamine, morpholine, methyl cyclohexylamine or glucosamine may be obtained by reacting the acid with the appropriate organic base. The amides included within Formulas I and II above are conveniently synthesized by first preparing the amide of a 3-indolinyl lower aliphatic acid unsubstituted at the 1-position and then acylating said compound by the process described hereinbelow. Such amides are conveniently obtained by reacting the free acid with urea or treating the appropriate acid chloride with ammonia or an alkylamine or other substituted amine to form an N-alkylamide or other substituted amide. Amides may also be prepared from the 1-acyl indolinyl acids by acid chloride formation and reaction with the appropriate amine.

The 3-position of the indoline nucleus may also carry as a second substituent a lower alkyl group. Usually, however, it is hydrogen. Such additional substituents at the 3-position are introduced in the formation of the intermediate indoline before acylation as more fully described below.

The substituents on the 2-position of the indoline ring nucleus may be hydrogen although it is preferred that there be present at this position of the molecule a hydrocarbon radical having less than nine carbon atoms. Lower alkyl groups such as methyl, ethyl, propyl or butyl are the most satisfactory but 2-phenyl and 2-benzyl substituted indolines are within the purview of this invention as are indolines having at the 2-position an unsaturated aliphatic radical such as allyl or vinyl or a cyclic aliphatic residue such as cyclohexyl.

The following compounds are representative of those contemplated for use in this invention and which may be prepared by the procedures discussed hereinbelow:

Methyl (1-p-chlorobenzoyl-2-methyl-5-methoxy - 3-indolinyl)-acetate,
methyl (1-p-chlorobenzoyl-2,5-dimethyl - 3 - indolinyl) acetate,
methyl (1-p-methylthiobenzoyl-2-methyl - 5 - methoxy-3-indolinyl)-aceate,
α-(1-p-chlorobenzoyl-2-methyl-5-methoxy - 3 - indolinyl) propionic acid,
(1 - p - chlorobenzoyl - 2 - methyl-5-methoxy-3-indolnyl) acetic acid,
(1-benzoyl-2-methyl-5-methoxy-3-indolinyl) - acetamide,
β - [1-(2,4-dichlorobenzoyl)-2-methyl-5-methoxy-3-indolinyl)-propionic acid,
methyl [1-(2'-thenoyl) -2 -methyl-5-methoxy-3-indolinyl] acetate,
α-[1-(p-chlorobenzoyl)-2-ethyl - 5 - methyl-3-indolinyl] propionic acid,
β-[1-(2'-furoyl)-2,5-dimethyl-3-indolinyl]-propionic acid,
β-[1-(nicotinoyl)-5-methoxy-3-indolinyl] - propionic acid,
β-[1-(naphthoyl)-3-indolinyl]-propionic acid,
β-[1-(4'-thiazolyl)-5-methox y- 3 - indolinyl] - propionamide and the like.

The 1-aroyl or hetero-aroyl-3-indolinyl lower aliphatic acids and derivatives thereof described herein are synthesized in one method of preparation, by hydrogenation of an N₁-unsubstituted indole, followed by acylation of the resulting 3-indolinyl aliphatic acid, ester or amide. It is preferred to carry out the acylation on an ester or amide derivative of the lower aliphatic acid. In those cases where the free acid is desired, the ester may be converted to the free acid or the intermediate 1-unsubstituted indolinyl free acid can be directly acylated. Where the acyl group is to contain a sulfur containing substituent, the latter course is preferred to avoid poisoning the catalyst during the reduction. Unlike the corresponding indoles, the indoline hetero-nitrogen is basic enough to permit ready acylation by ordinary methods, such as with acid halides or anhydrides in the presence of a tertiary organic base such as pyridine, or even by a Schotten-Baumann acylation in aqueous caustic. The acyl group thus formed is sufficiently stable to permit saponification of ester groups in the carboxylic side chain, so long as mild conditions are used. Conditions for such saponification are agitation in alcoholic or aqueous caustic. Usually caustic soda of 2 N or 3 N strength and overnight agitation at room temperature are sufficient. Weaker base will use higher temperatures and stronger base will require refrigeration. The caustic used may be any alkali or alkaline earth metal hydroxide or a quaternary ammonium hydroxide or even an aqueous solution of ammonia or an amine.

When the 1-acyl indolinyl free acids are prepared by hydrogenation of the corresponding 1-acyl indolyl free acids, the latter are prepared by the special methods necessary in their case. These indole precursors must be synthesized by methods requiring more care. One convenient method of accomplishing the deesterification of the 1-acyl indolyl esters comprises acylation of the benzyl ester and subsequent hydrogenolytic removal of the benzyl ester. Alternatively, ether esters such as the t-butyl esters, or other tertiary other esters, which are amenable to selective removal by other treatment, such as heating above 210° C. or by heating at 25–110° C. in the presence of a catalytic amount of an aryl sulfonic acid or other acids may be utilized. When, instead of an ester, the amides of these acids are prepared, the free acids are formed by reaction of the amides with a stoichiometric quantity of nitrous acid in an inert solvent.

The acylation reaction is preferably conducted in the indole series by treating the α-(3-indolyl) lower aliphatic ester starting material with an alkali metal hydride, such as sodium hydride, to form e.g. a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation of the indolyl acids at about room temperature although lower temperatures may be employed if the particular reactants are unduly susceptible to decomposition.

An alternative method of acylating the 1-position in an indolyl ester is by use of a phenolic ester of the acylating acid, such as the p-nitrophenyl ester. This latter is prepared by mixing the acid and p-nitrophenol in tetrahydrofuran and adding dicyclohexyl carbodiimide in tetrahydrofurane slowly. The dicyclohexylurea which forms is removed by filtration and the nitrophenylester is recovered from the filtrate. Alternatively there can also be used the anhydride, azide or thiophenolic ester of the acylating acid. Whichever is used, the acylation of the 3-indolyl lower aliphatic ester starting material is achieved by forming a sodium salt of said material with sodium hydride in an anhydrous solvent and adding the nitrophenylester.

The 1-acyl indole acids thus prepared are then hydrogenated catalytically to form the 2,3-dihydroindole (i.e., indoline) acids used in this invention. Such reduction is carried out at low pressure and ambient temperatures over a catalyst such as palladium on charcoal or platinum oxide. When the reduction to the indoline is carried out before acylation, a process preferred because it eliminates the difficulties inherent in the acylation and saponification of the indole acid esters, the reduction is carried out over a nickel catalyst at higher pressures and ambient temperatures. Such reductions are usually preferred in an inert solvent such as glacial acetic acid, at room temperature at about 2000 p.s.i.

The 1-aroyl or hetero-aroyl-3-indolinyl lower aliphatic acid compounds used in this invention have a high degree of anti-inflammatory activity, especially the novel 1-substituted aroyl compound, and are effective in the prevention and inhibition of granuloma tissue formation. Certain of them possess this activity in high degree and are of value in the treatment of arthritic and dermatological disorders and in like conditions which are responsive to treatment with anti-inflammatory agents. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–4000 mg. per day are useful in control of arthritic conditions, depending on the activity of the specific compound and the reaction sensitivity of the patient.

The indolinyl aliphatic acid compounds employed as starting material in the reaction discussed above, and having the formula:

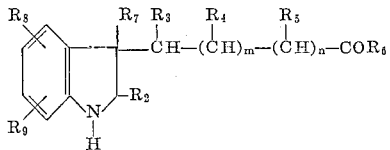

where $R_2$, $R_3$, $R_4$, $R_5$, $R_7$, $R_8$ and $R_9$ have the previously defined meanings and $R_6$ is an alkoxy radical or a substituted or unsubstituted amide radical may be synthesized in various ways. In general, they can be formed from the corresponding indole by reduction as described below. The indoles can be synthesized by the following methods. When $R_2$ is hydrogen, methyl, aryl or aralkyl and $R_5$ is hydrogen it is preferred to form such compounds by reacting together an appropriately substituted phenylhydrazine and an ester or amide of the formula shown below to form an intermediate phenylhydrazone which cyclizes under the reaction conditions to the indole compounds:

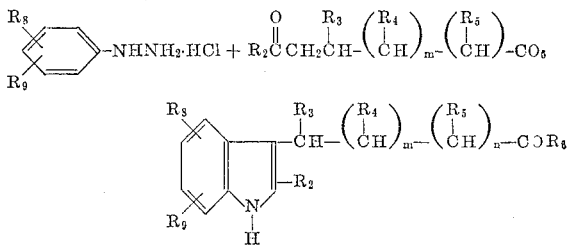

The reaction is normally carried out in a lower alkanol such as methanol, ethanol, isopropanol or butanol containing an acid such as hydrochloric, hydrobromic, sulfuric or acetic acid or in aqueous mineral acid such as concentrated hydrochloric, hydrobromic, sulfuric or acetic aid, or other Lewis acids such as $ZnCl_2$, $BF_3$, $SnCl_4$ and the like. The acid serves as a catalyst in the condensation and ring closure reactions leading to the indole. When the ester or amide starting material is an ester, the nature of the ester is not critical, although it is preferred to utilize a lower alkyl ester, e.g., the methyl, ethyl, propyl, isobutyl or isopropyl compound. To avoid the possibility of transesterification the alcohol used as the solvent medium is preferably the same as the alcohol moiety of the ester. When $R_2$ is hydrogen, it is convenient to employ the aldehyde in the form of an acetal, e.g., methyl γ,γ-dimethoxy butyrate. An acid addition salt of the phenylhydrazine reactant, for example the hydrochloride, is normally preferred over the free base for pratcical reasons, although such salts and the base are equivalent in the reaction itself.

Formation of the 3-indolyl aliphatic acid, or ester thereof, is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the indole esters are low melting solids, they are conveniently purified by distillation under reduced pressure. They are saponified by treatment with an alkali metal hydroxide.

The substituted phenylhydrazines employed as one of the starting materials in this synthesis are prepared by known methods. One convenient method is by diazotization of the appropriately substituted aniline to give the diazo compound, treatment of the latter with stannous chloride to form a tin complex, and decomposition of this complex to the phenylhydrazine with sodium hydroxide.

Alternatively, it is possible to first produce an indole of the formula:

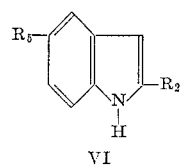

VI where $R_2$ and $R_5$ have the same meaning, and then introduce the carboxylic acid residue at the 3-position. This is accomplished by treating the indole of Formula VI under Mannich reaction conditions with formaldehyde-dialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_2$ is an alkyl radical other than methyl, such as the 2-ethyl, 2-propyl, and like substances. Compounds of Formula VI are readily prepared following the procedures set forth in columns 2 and 3 of U.S. Patent No. 2,825,734. Products where $R_5$ is acyloxy, halo, carboxy, carbalkoxy, alkyl, aryl, aralkyl, nitro or hydrocarbonoxy are prepared via the synthesis beginning from a substituted 2-nitro benzaldehyde or 2-nitrotoluene.

The synthesis of various compounds of this invention having on the indoline ring system a 5-substituent which has a nitrogen attached to the homocyclic ring of the indoline is generally based on the corresponding 5-nitroindole. This is transformed into the desired 5-substituent. Such transformation may be before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. In any case, the transformation must take place before reduction of the indole to the indoline, since such reduction will also reduce the nitro to an amino group.

Such transformation of the nitro group into other nitrogen substituents can be carried out in a number of ways. Reduction of the 5-nitro groups gives a 5-amino group. Reaction of the amino with alkyl halides give mono and dialkyl amino groups. If the alkyl halide is a dihaloalkylene group (e.g., pyrrolidino) is formed. Similarly, bis(β-chlorethyl)ether will give an N-morpholino compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds.

The 5-amino group can be reacted with isocyanates to give 5-ureido compounds.

The following examples are given for purposes of illustration and not by way of limitation:

EXAMPLE 1

A. *Ethyl-α-(2-methyl-5-methoxy-3-indolyl)-propionate*

A solution of 25 g. of p-methoxyphenylhydrazine hydrochloride and 20 g. of ethyl α-methyl levulinate in 250 ml. of 2 N ethanolic hydrochloride is heated on a steam bath for a few minutes. An exothermic reaction takes place with the separation of ammonium chloride. The reaction flask is removed from the steam bath and the mixture allowed to reflux gently until the initial reaction subsides. The mixture is again heated on a steam bath under reflux for 30 minutes, and then concentrated in vacuo to a volume of about 80 ml. The concentrate is diluted with about 400 ml. of water and extracted with ether. The resulting ethereal extract is washed with a saturated solution of sodium bicarbonate, and with water, and dried over anhydrous sodium sulfate. The dried solution is filtered and evaporated to a dark brown syrup which is purified by chromatography over about 1 lb. of acid-washed alumina in a 2¼″ I.D. column using mixtures of ether and petroleum ether (v./v. 1:9 to 1:1) as eluent. The light yellow syrup so obtained is distilled in a short-path distillation apparatus and the product collected at B.P. 150–153° C. (0.25 mm.). The distillate of ethyl-α-(2-methyl-5-methoxy - 3 - indolyl)-propionate crystallizes on trituration with petroleum ether, M.P. 53–55.5° C. On recrystallization from a mixture of ether and petroleum ether the melting point is unchanged.

Calcd. for $C_{15}H_{19}O_3N$: C, 68.94; H, 7.33; N, 5.36. Found: C, 69.23; H, 7.31; N, 5.60.

When the methyl, propyl, isopropyl or benzyl ester of α-methyl levulinic acid is employed in the above reaction in place of the ethyl ester, there is obtained methyl-α-(2-methyl - 5 - methoxy-3-indolyl)-propionate, propyl-α-(2-methyl-5-methoxy-3-indolyl) - propionate, isopropyl-α-(2-methyl - 5 - methoxy-3-indolyl)-propionate, respectively. Alternatively, when an ester of levulinic acid is used as starting material in the above process, the corresponding ester of α-(2-methyl-5-methoxy-3-indolyl)-acetic acid is obtained.

B. *Ethyl-α-(2,5-dimethyl-3-indolyl)-propionate*

20 g. of p-methylphenylhydrazine hydrochloride and 20 g. of ethyl α-methyl levulinate are added to 250 ml. of 2 N ethanolic hydrogen chloride and the mixture warmed until reaction sets in. After the initial exothermic reaction stops, the mixture is refluxed for about ½ hour and then concentrated in vacuo to about ⅓ volume. 400 ml. of water are added and the aqueous solution extracted with ether. The ether extracts are washed with sodium bicarbonate solution, and with water, then dried over sodium sulfate. The ether solution is concentrated to a small volume in vacuo and chromatographed over acid-washed alumina (1 lb. of alumina in a 2¼″ I.D. column). The material eluted with ether-petroleum ether (v./v. 9:1 to 1:1) is distilled in a short-path distillation apparatus. Ethyl-α-(2,5-dimethyl-3-indolyl) - propionate distills at 150–170° (bath temp.)/1 mm., and crystallizes on trituration with petroleum ether, M.P. 88–88.5° C.

When a lower alkyl or benzyl levulinate is employed in place of ethyl α-methyl levulinate, lower alkyl- or benzyl-(2,5-dimethyl-3-indolyl)-acetate is produced.

EXAMPLE 2

*Ethyl-α-(1-p-methylthiobenzoyl-2-methyl-5-methoxy-3-indolyl)-propionate*

A suspension of 2.3 g. (0.046 m.) of 50% sodium hydride-mineral oil in 250 ml. of dimethylformamide is stirred for 20 minutes under nitrogen with ice-cooling. Then 8.64 g. (0.035 m.) of ethyl-α-(2-methyl-5-methoxy-3-indolyl)-propionate is added and the mixture stirred for 20 minutes. 8.6 g. (0.046 m.) of p-methylthiobenzoyl chloride in 50 ml. of dimethylformamide is added dropwise over a period of 30 minutes. The mixture is stirred in an ice-bath for 5 hours under nitrogen. It is then poured into a mixture of 500 ml. of ether, 5 ml. of acetic acid and 1 l. of iced water. The organic products are extracted with 3 x 300 ml. of ether. The ether solutions are combined and washed with a large quantity of water, and dried over sodium sulfate. The solution is filtered, evaporated to near dryness and the residue charged onto a 300 g. alumina column. The ethyl-α-(1-p-methylthiobenzoyl-2-methyl-5-methoxy - 3 - indolyl)-propionate is eluted with 10% ether in petroleum ether. It is obtained as a yellow oil on concentration of the eluates to dryness.

The p-methylthiobenzoyl chloride starting material is obtained by heating a mixture of 27 g. (0.15 m.) of p-methylthiobenzoic acid and 21.4 g. (0.18 m.) of thionyl chloride on a steam bath for 1 hour. About 20 ml. of benzene is then added and boiled off. The remaining solution is centrifuged and diluted with petroleum ether. On cooling, the acid chloride separates, M.P. 40–44° C.

When methyl-(2-methyl-5-methoxy-3-indolyl)-acetate is employed as the starting material in the above process, there is obtained methyl-(1-p-methylthiobenzoyl-2-methyl-5-methoxy-3-indolyl)-acetate.

EXAMPLE 3

*Methyl-α-(1-p-chlorobenzoyl-2-methyl-5-methoxy-3-indolyl)-acetate*

To 3.9 g. (0.078 m.) of 51% sodium hydride-mineral oil suspended in 150 ml. of distilled dimethylformamide, in a 1 liter 3-neck flask, is added with stirring at 0° C., 9.5 g. (0.040 m.) of methyl-(2-methyl-5-methoxy-3-indolyl)-acetate in 150 ml. of dimethylformamide. The mixture is allowed to stir for 1 hour and then 9.1 g. (0.052 m.) of p-chlorobenzoyl chloride in 50 ml. of dimethylformamide is added dropwise over a period of 30 minutes. The reaction mixture is stirred another 30 minutes at 0° C. and then allowed to stand 12 hours in the cold.

The reaction mixture is then filtered and the solids washed with ether. The ether is added to the filtrate which is then washed with water and dried over sodium sulfate. After filtering off the sodium sulfate, approximately 75 g. of acid-washed alumina is added to the ethereal solution and this mixture concentrated to dryness.

The indole-coated alumina is then packed on top of a column of 400 g. of alumina. The column is eluted with petroleum ether containing increasing amounts of ethyl ether. Methyl-α-(1-p-chlorobenzoyl-2-methyl-5-methoxy-3-indolyl)-acetate is eluted with 15% ether-petroleum ether. These latter eluates are combined and concentrated to dryness. Recrystallization of the residue from benzene-petroleum ether yields substantially pure methyl-α-(1-p-chlorobenzoyl - 2 - methyl-5-methoxy-3-indolyl)-acetate, M.P. 99–100° C.

Carrying out the above-noted process with ethyl-α-(2-methyl-5-methoxy-3-indolyl)-propionate or benzyl-α-(2,5-dimethyl - 3 - indolyl)-propionate yields, respectively, ethyl-α-(1-p-chlorobenzoyl - 2 - methyl-5-methoxy-3-indolyl)-propionate and benzyl-α-(1-p-chlorobenzoyl-2,5-dimethyl-3-indolyl)-propionate.

EXAMPLE 4

*Ethyl-α-[1-(o-methyl-p-methylthiobenzoyl)-2-methyl-5-methoxy-3-indolyl]-propionate*

A mixture of 100 ml. of dimethylformamide, 5.2 g. (0.02 m.) of ethyl-α-(2-methyl-5-methoxy-3-indolyl)-propionate and 1.2 g. (0.025 m.) of sodium hydride in mineral oil (50% dispersion) is stirred in an ice-bath under nitrogen for 1 hour. A solution of 4.0 g. (0.02 m.) of 2-methyl-4-methylthiobenzoyl chloride (prepared from the acid, M.P. 159–162° C., and thionyl chloride) and 25 ml. of dimethylformamide is then added during 0.5 hour, and stirring is continued for 16 hours at room temperature. The mixture is poured into 350 ml. of water, extracted with ether, and the ether solution washed with water, dried over magnesium sulfate, filtered and evaporated to dryness under reduced pressure. The residual oil is dissolved in petroleum ether (60–70° C.) and chromatographed on 250 g. of acid-washed alumina. The ethyl-α-[1-(o-methyl-p-methylthiobenzoyl) - 2 - methyl-5-methoxy-3-indolyl]-propionate is eluted with 15% ether in petroleum ether and isolated as an oil.

I.R. $\lambda_{max.}^{CHCl_3}$ 5.77 (CO), 5.94 (CO), 6.21, 6.73

EXAMPLE 5

Ethyl-α-(1-benzoyl-2-methyl-5-methoxy-3-indolyl)-propionate

To a solution of 5.22 g. of ethyl-α-(2-methyl-5-methoxy-3-indolyl)-propionate in 20 ml. of dimethylformamide is added a suspension of 1.2 g. of 51% sodium hydride in mineral oil in 40 ml. of dimethylformamide. After 1 hour of stirring at room temperature, a solution of 2.88 ml. of benzoyl chloride in 10 ml. of dimethylformamide is added to initiate a mild exothermic reaction with precipitation of sodium chloride. The reaction mixture is stirred for 6 hours followed by standing overnight. The mixture is poured into about 200 g. of ice and extracted with ether three times. The ethereal solution is washed with water, sodium bicarbonate and dried over potassium carbonate. After filtration the solution is evaporated to a syrup and chromatographed on a column of 100 g. of acid-washed alumina, using mixtures of benzene-petroleum ether (2:1 to 3:1 v./v.) as eluent. A total of 1.06 g. of ethyl-α-(1-benzoyl-2-methyl-5-methoxy-3-indolyl)-propionate is obtained as a thick yellow oil. The infrared spectrum shows no N–H absorption near the 2.8–3μ region but shows strong C=O absorptions at 5.8 and 5.95μ characteristic for ester and amide functional groups, respectively.

EXAMPLE 6

Ethyl-α-(1-p-chlorobenzoyl-2-methyl-5-methoxy-3-indolyl)-propionate 13 g. of ethyl-(2-methyl-5-methoxy-3-indolyl)-propionate is added to a mixture of 2.5 g. of 51% sodium hydride-mineral oil emulsion in 240 ml. of dimethylformamide. The resulting mixture is stirred at room temperature for 30 minutes and then a solution of 8.75 g. of p-chlorobenzoyl chloride in 50 ml. of dimethylformamide is added slowly thereto over a 40-minute period. The mixture is then stirred in an ice-bath for 4 hours under nitrogen. It is then poured into a mixture of ether, acetic acid and water as described in Example 2. Following the work-up procedure and using a 200 g. column of alumina for the chromatography step, and eluting with a mixture of 1:1 benzene-petroleum ether, ethyl-α-(1-p-chlorobenzoyl - 2 - methyl - 5-methoxy-3-indolyl)-propionate is obtained as a yellow oil.

EXAMPLE 7

(1-benzoyl-2-methyl-5-methoxy-3-indolyl)-acetic acid

A. A solution of 15 g. of methyl-(2-methyl-5-methoxy-3-indolyl)-acetate and 0.2 g. of sodium in 60 ml. of benzyl alcohol is slowly fractionated over a period of 4½ hours through a Vigreux column to remove methanol. The excess benzyl alcohol is then removed by distillation at 60° C. (2.5 mm.) to give a residue of 18.6 g. of benzyl-(2-methyl-5-methoxy-3-indolyl)-acetate.

B. 10 g. of the benzyl ester obtained above is added to 3.3 g. of 51% sodium hydride-mineral oil emulsion in 260 ml. of dimethylformamide according to the procedure of Example 2. This mixture is treated as described in that example in 7.7 ml. of p-chlorobenzoyl chloride and the reaction mixture worked up by the above-described process using a chromatographic column of 340 g. of alumina and eluting with 20–30% ether in petroleum ether. From these eluates there is obtained benzyl-(1-benzoyl - 2 - methyl - 5 - methoxy-3-indolyl)-acetate, M.P. 91–92° C.

C. 1.5 g. of the ester obtained in Part B above is added to 20 ml. of ethyl acetate containing a drop of acetic acid and reduced catalytically at room temperature in the presence of palladium on charcoal catalyst. When the reduction is complete the catalyst is removed by filtration and the filtrate evaporated to a crystalline residue. This residue is recrystallized from aqueous ethanol to give 1-benzoyl-(2-methyl-5-methoxy-3-indolyl)-acetic acid, M.P. 172–173° C. Alternatively, the residue obtained on removal of the reaction solvent may be purified by dissolving in chloroform and precipitating by addition of petroleum ether to the chloroform solution.

EXAMPLE 8

Ethyl-α-(1-p-fluorobenzoyl-2-methyl-5-methoxy-3-indolyl)-propionate 10.5 g. of ethyl-α-(2-methyl-5-methoxy-3-indolyl)-propionate is added to a suspension of 2.2 g. of 51% sodium hydride-mineral oil emulsion in 240 ml. of dimethylformamide. After stirring for 25 minutes, 7.5 g. of p-fluorobenzoyl chloride is added thereto slowly over a 40-minute period, and the resulting mixture stirred for 40 minutes at 10–15° C. The reaction mixture is then poured into 400 ml. of water and the product isolated as described in Example 4 to give substantially pure etheyl-α-(1-p-fluorobenzoyl-2-methyl-5-methoxy-3-indolyl)-propionate.

When the above process is carried out by reacting the sodium salt of methyl-α-(2-methyl-5-methoxy-3-indolyl)-propionate with p-trifluoromethylbenzoyl chloride, there is obtained methyl - α - (1 - p - trifluoromethylbenzoyl - 2-methyl-5-methoxy-3-indolyl)-propionate.

EXAMPLE 9

The corresponding N–1 aroyl or hetero-aroyl derivatives of benzyl-α-(2-methyl-5-methoxy-3-indolyl)-propionate and benzyl - (2-methyl-5-methoxy-3-indolyl)-acetate are obtained by reacting together in equimolar amounts and according to the procedure of Example 3, the sodium salts of these esters and one of the compounds: 3,4,5-trimethoxy benzoyl chloride, p-phenoxy benzoyl chloride, p-trifluoroacetyl benzoyl chloride, p-N,N-dimethylsulfamyl benzoyl chloride, 1-methyl-benzimidazole-2-carboxy chloride, p-acetylbenzoyl chloride, N,N-dimethyl-p-carboxamidobenzoyl chloride, p-carbomethoxybenzoyl chloride, p-formylbenzoyl chloride, N,N-dimethyl-p-sulfonamidobenzoyl chloride, p-dimethylaminobenzoyl chloride, p-acetaminobenzoyl chloride, o-fluoro-p-chlorobenzoyl chloride, o-methoxy-p-chloro-benzoyl chloride, o-hydroxy-p-chlorobenzoyl chloride, 2,4,5-trichlorobenzoyl chloride.

The resulting 1-substituted indolyl esters are converted to the corresponding free acids by the procedure of Example 7C.

EXAMPLE 10

1-p-chlorobenzoyl-2-methyl-5-methoxy-3-indolyl-acetic acid

A. *2-methyl-5-methoxy-3-indolylacetic anhydride.*—Dicyclohexylcarbodiimide (10 g., 0.049 mole) is dissolved in a solution of 2-methyl-5-methoxy-3-indolylacetic acid (22 g., 0.10 mole) in 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification in the next step.

B. *t-Butyl 2-methyl - 5-methoxy - 3-indolylacetate.*—t-Butyl alcohol (25 ml.) and fused zinc chloride (0.3 g.) are added to the anhydride from part A. The solution is refluxed for 16 hours and excess alcohol is removed in vacuo. The residue is dissolved in ether, washed several times with saturated bicarbonate, water, and saturated salt solution. After drying over magnesium sulfate, the solution is treated with charcoal, evaporated, and flushed several times with Skellysolve B for complete removal of alcohol. The residual oily ester (18 g., 93%) is used without purification.

C. *t-Butyl 1-p-chlorobenzoyl - 2-methyl - 5-methoxy - 3-indolylacetate.*—A stirred solution of ester (18 g., 0.065 mole) in dry DMF (450 ml.) is cooled to 4° in an ice bath, and sodium hydride (4.9 g., 0.098 mole, 50% susp.) is added in portions. After 15 minutes, p-chlorobenzoyl chloride (15 g., 0.085 mole) is added dropwise during 10 minutes, and the mixture is stirred for 9 hours without replenishing the ice bath. The mixture is then poured into 1 l. of 5% acetic acid, extracted with a mixture of ether and benzene, washed thoroughly with water, bicarbonate, saturated salt, dried over magnesium sulfate, treated with charcoal, and evaporated to a residue which partly crystallizes. This is shaken with ether, filtered, and the filtrate is evaporated to a residue (17 g.) which solidifies after being refrigerated overnight. The crude product is boiled with 300 ml. of Skellysolve B, cooled to room temperature, decanted from some gummy material, treated with charcoal, concentrated to 100 ml., and allowed to crystallize. The product thus obtained (10 g.) is recrystallized from 50 ml. of methanol and gives 4.5 g. of analytically pure material, M.P. 103–4°.

D. *1-p-chlorobenzoyl-2-methyl-5-methoxy-3-indolylacetic acid.*—A mixture of 1 g. ester and 0.1 g. powdered porous plate is heated in an oil bath at 210° with magnetic stirring under a blanket of nitrogen for about 2 hours. No intensification of color (pale yellow) occurs during this period. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid. The crude product (0.4 g., 47%) is recrystallized from aqueous ethanol and dried in vacuo at 65°; M.P. 151°.

EXAMPLE 11

*1-p-methylthiobenzoyl-2-methyl-5-methoxy-3-indolyl-α-propionic acid*

A. *2-methyl - 5-methoxy - 3-indolyl-α-propionic anhydride.*—Dicyclohexylcarbodiimide (9 g. 0.44 mole) is dissolved in a solution of 2-methyl-5-methoxy-3-indolyl-α-propionic acid (21 g., 0.09 mole) and 200 ml. of THF, and the solution is allowed to stand at room temperature for 2 hours. The precipitated urea is removed by filtration, and the filtrate is evaporated in vacuo to a residue and flushed with Skellysolve B. The residual oily anhydride is used without purification.

B. *t-Butyl 2-methyl-5-methoxy-3-indolyl-α-propionate.*—t-Butyl alcohol (25 ml.) and fused zinc chloride (0.3 g.) are added to the above anhydride. The solution is refluxed for 16 hours, and excess alcohol is removed in vacuo. The residue is dissolved in ether, washed several times with saturated bicarbonate, water and saturated salt solution. After drying over magnesium sulfate the solution is treated with charcoal, evaporated, and flushed several times with Skellysolve B for complete removal of alcohol. The residual oil ester (14 g.) is used without purification.

C. *t-Butyl 1-p-methylthiobenzoyl-2-methyl-5-methoxy-3-indolyl-α-propionate.*—A stirred solution of ester from Part "B" (20 g., 0.69 mole) in 450 ml. of dry dimethylformamide is cooled to 4° in an ice bath and sodium hydride (5.2 g., 0.10 mole, 50% susp.) is added in portions. After the mixture is stirred for 10 minutes, p-methylthiobenzoyl chloride (M.P. 51°; 17 g., 0.091 mole) is added in portions during 10 minutes, and the mixture is stirred for 7 hours at room temperature without replenishing the ice bath. The mixture is then poured into 1 l. of 5% acetic acid, extracted with ether, washed thoroughly with water, bicarbonate, saturated salt solution, dried over magnesium sulfate, treated with charcoal, and evaporated in vacuo to a residue (33 g.). This is dissolved in ether, mixed with 100 g. of acid washed alumina, and evaporated in vacuo to dryness, which is placed above a column of 300 g. of acid washed alumina in Skellysolve B. After washing with Skellysolve B, the product is eluted with 5% ether-Skellysolve B, and is obtained as a yellow oil (11 g., 36%).

D. *1-p-methylthiobenzoyl - 2-methyl - 5-methoxy - 3-indolyl-α-propionic acid.*—The pyrolysis is carried out in the same manner as with t-butyl 1-p-chlorobenzoyl-2-methyl-5-methoxy-3-indolyl acetate (of Example 10D). The product is recrystallized from aqueous ethanol or benzene-Skellysolve B; M.P. 175–6°.

EXAMPLE 12

*1-p-chlorobenzoyl-2-methyl-5-methoxy-3-indolyl-α-propionic acid*

A. To a solution of 20.0 g. (0.07 mole) of t-butyl-α-(2-methyl-5-methoxy-3-indolyl)-propionate in 270 ml. dimethylformamide is added in small portions 7.0 g. (0.14 mole) of 51% sodium hydride in mineral oil under $N_2$ with stirring and ice-cooling. After 15 minutes, 17.5 g. (0.10 mole) of the p-chlorobenzoyl chloride is added dropwise, a white precipitate separates out almost immediately. The mixture is stirred at 0° for 2 hours and is allowed to stand in the cold room overnight. The next morning the mixture is filtered and diluted with ether. One-half of the solution is washed with water, sodium bicarbonate, water successively and dried over sodium sulfate. The dried solution is concentrated to a syrup which is chromatographed on 400 g. of acid-washed alumina. After mineral oil and trace of impurity is eluted by petroleum ether and 5% ether in petroleum ether, the desired product is obtained by elution with 10% ether in petroleum ether as yellow oil. The other half is similarly treated.

B. The above ester and a few pieces of porous plate chips are placed in a flash submerged in an oil bath. A steady stream of $N_2$ is introduced into the test tube through the opening while the temperature of the oil bath is slowly raised to 215°. After ½ hour at 215°, the mixture is dissolved in ether, filtered and washed with sodium bicarbonate. The bicarbonate extract is acidified with dilute hydrochloric acid, and the precipitate is taken into ether, washed with water, dried over sodium sulfate and evaporated to dryness. The solid residue is recrystallized from a mixture of benzene and petroleum ether to give the desired acid, M.P. 87–88°.

EXAMPLE 13

*Methyl-(1-isonicotinyl-2-methyl-5-methoxy-3-indolyl)acetate*

A. In a 500 ml. round bottom flask (all equipment flame dried) is added 13.9 g. of p-nitrophenol and 12.3 g. isonicotinic acid in 250 ml. dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated in dryness. The solid is taken up in benzene and washed with sodium bicarbonate solution and then with water and dried over anhydrous sodium sulfate. The solution is concentrated under vacuum to dryness. The solid p-nitrophenylisonicotinate is then recrystallized from benzene, M.P. 126–127° C.

B. In a 250 ml. round bottom flask (flame dried equipment) is placed at 0° C. with nitrogen, 100 ml. of dry dimethylformamide with 10.5 g. of methyl-α-(2-methyl-5-methoxy-3-indolyl) acetate. To this is added 2.5 g. of 50% sodium hydride mineral oil mixture. After the mixture is stirred for 30 minutes there is added over 15 minutes a solution of 11 g. of p-nitrophenylisonicotinate in 50 ml. dry dimethylformamide. The reaction mixture is stirred for 4 hours at 0° C. under nitrogen followed by stirring under nitrogen at room temperature over night. The reaction mixture is then poured into an ice water-ether solution containing a few ml. of acetic acid and the layers are separated. The aqueous phase is washed with ether and the ether extracts are combined. To the ether layers is added a saturated solution of hydrogen chloride gas in dry ether. The ether is decanted off, leaving a heavy oil. The oil is washed with ether followed by an addition of aqueous sodium bicarbonate solution. The product is then extracted with ether. The ether layer is dried over anhydrous sodium sulfate and concentrated to dryness. The product is crystallized from dry ether, M.P. 114–115° C.

*Microanalysis.*—Calc. C, 67.45; H, 5.37; N, 8.28. Found: C, 67.67; H, 5.50; N, 8.14.

EXAMPLE 14

*Methyl(2-methyl-5-nitro-3-indolyl)acetate*

A solution of 40 g. of levulinic acid in 300 ml. of hot water is added to a solution of 65 g. of p-nitrophenyl-hydrazine hydrochloride in 700 ml. of hot water with stirring. After about one-half hour, the hydrazone derivative is collected in a filter, washed with water and dried at 110° in vacuo. The yield is 84 g., M.P. 175–179°.

An amount of 42 g. of the above hydrazone is added to a solution of 120 g. of fused zinc chloride in 100 ml. of absolute ethanol and the mixture is refluxed for 18 hours. The cooled solution is poured into dilute hydrochloric acid with stirring, and the insoluble gummy material separated is extracted with hot ethanol. The ethanolic extract is evaporated in vacuo to a syrup, which is redissolved in ether. The ether solution is extracted with 10% sodium carbonate several times. Acidification of the aqueous solution gave a crude product which recrystallizes from chloroform to give (2-methyl-5-nitro-3-indolyl)acetic acid, M.P. 238°.

The above acid is treated with a mixture of 3 g. of sulfuric acid and 40 ml. of methanol at the reflux temperature for 6 hours. The methyl ester is obtained as a yellow crystalline product, M.P. 132–40° after recrystallization from benzene.

Similarly, methyl-α-(2-methyl-5-nitro-3-indolyl)-propionate is prepared by using an equivalent amount of α-methyl levulinic acid as the starting material.

EXAMPLE 15

*Methyl(2-methyl-5-amino-3-indolyl)acetate*

3 g. of methyl(2-methyl-5-nitro-3-indolyl) acetate is dissolved in 300 ml. dry methanol and reduced in hydrogen in an autoclave with Raney nickel as catalyst. After the theoretical amount of hydrogen is taken up the catalyst is removed by filtration. The catalyst and reaction flask are washed with methanol. The methanol solution is evaporated to dryness. The product is crystallized from benzene, M.P. 144–145°.

*Microanalysis.*—Calc. C, 66.03; H, 6.47; N, 12.84. Found: C, 65.96; H, 6.29; N, 12.56.

EXAMPLE 16

*Methyl[2-methyl-5-(1'-pyrrolidino)-3-indolyl] acetate*

In a 125 ml. flask is placed 80 ml. of ethanol. To this is added 1.0 g. of methyl (2-methyl-5-amino-3-indolyl) acetate, 0.99 g. of 1,4-dibromobutane and 0.975 g. of anhydrous sodium carbonate. This mixture is stirred at reflux temperature in a nitrogen atmosphere for 6 hours. The reaction mixture is then filtered and the filtrate is concentrated in vacuo to a small volume and diluted with ether. This solution is then washed with water 2×, dried with anhydrous sodium sulfate and concentrated in vacuo to dryness. The product is absorbed on 6 g. of silica gel. The product is then chromatographed over 30 g. of silica gel using as elutant from v./v. 3:1 ether-petroleum ether to ether. The eluted material is combined and crystallized from benzene-Skellysolve B, M.P. 117–118°.

*Microanalysis.*—Calc. C, 70.56; H, 7.40; N, 10.29. Found: C, 70.77; H, 7.72; N, 10.00.

When ethylene dibromide is used instead of dibromobutane, the product obtained is the 5-(1-azacyclopropyl) indolyl compound.

EXAMPLE 17

*Methyl(1-p-chlorobenzoyl-2-methyl-5-(1'-pyrrolidino)-3-indolyl) acetate*

In a dry 125 ml. flask is placed 1.2 g. of methyl (2-methyl-5-(1'-pyrrolidino)-3-indolyl) acetate in 60 ml. of dry dimethylformamide. To this solution, cooled to 0° C., is added 0.23 g. of 50% sodium hydride slurry in mineral oil. This mixture is stirred for 30 minutes. Then a solution of 0.8 g. of p-chlorobenzoyl chloride diluted with 5 ml. of dry dimethylformamide is added dropwise. This reaction is stirred for 4 hours at 0° C. under a nitrogen atmosphere. The reaction mixture is then stirred overnight at room temperature under a nitrogen atmosphere. The reaction mixture is added to an ice water-ether mixture containing a few milliliters of acetic acid.

The ether layer is separated and the aqueous layer is washed with ether. The combined ether layers are washed once with sodium carbonate and twice with water, dried over anhydrous sodium sulfate and evaporated in vacuo to an oil. The product is absorbed on 10 g. of silica gel and chromatographed from 60 g. silica gel. The product is collected using v./v. 1:3 to 1:1 ether-petroleum ether. The combined material is crystallized from ether, M.P. 62–64°.

EXAMPLE 18

*Methyl-(1-p-chlorobenzoyl-2-methyl-5-nitro-3-indolyl) acetate*

In a dried 250 ml. flask is placed 3.9 g. of methyl-(2-methyl-5-nitro-3-indolyl) acetate in 125 ml. dry dimethylformamide. To this solution cooled to 0° C. is added 0.8 g. of 50% sodium hydride-mineral oil. This is stirred under nitrogen for 30 minutes. To this is added dropwise 2.75 g. of p-chlorobenzoyl chloride in 15 ml. of dry dimethylformamide over a 5-minute period. The reaction mixture is stirred 4 hours at 0° C. under nitrogen and then stirred overnight at room temperature under nitrogen. It is then poured into an ice-water-benzene solution containing a few milliliters of acetic acid. The benzene layer is separated and the aqueous layer is washed with benzene. The combined benzene layers are washed with sodium bicarbonate followed by water, dried over anhydrous sodium sulfate and concentrated to dryness in vacuo. The product is crystallized from benzene-Skellysolve B, M.P. 170–171°.

*Microanalysis.*—Calc. C, 59.00; H, 3.91; N, 7.24. Found: C, 59.24; H, 4.00; N, 7.39.

The corresponding propionate is formed when an equivalent amount of the corresponding methyl-α-(2-methyl-5-nitro-3-indolyl) propionate prepared in Example 13 is used as the starting material.

EXAMPLE 19

*Methyl-(1-p-chlorobenzoyl-2-methyl-5-dimethylamino-3-indolyl) acetate*

To a solution of 0.387 g. of methyl-α-(1-p-chlorobenzoyl-2-methyl-5-nitro-3-indolyl) acetate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil.

*Microanalysis.*—Calcd. C, 65.50; H, 5.50; N, 7.28. Found: C, 65.66; H, 5.91; N, 7.46.

EXAMPLE 20

*Methyl-(1-p-chlorobenzoyl-2-methyl-5-acetamino-3-indolyl) acetate*

To 0.388 g. of methyl-(1-p-chlorobenzoyl-2-methyl-5-nitro-3-indolyl) acetate in 30 ml. of anhydrous ethylacetate is added 0.306 g. acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice water-ether mixture. The ether layer is separated and the aqueous layer is washed with ether. The combined ether extracts are washed with sodium bicarbonate followed by water, dried with anhydrous sodium sulfate and concentrated in vacuo to dryness. The product is crystallized from benzene and ether, M.P. 176–177° C.

*Microanalysis.*—Calc. C, 63.25; H, 4.80; N, 7.02. Found: C, 63.40; H, 4.82; N, 6.89.

EXAMPLE 21

*Benzyl-(2-methyl-5-nitro-3-indolyl) acetate*

In a dry 250 ml. flask is placed 80 ml. dry benzene and 20 ml. benzyl alcohol. To this is added 3.0 g. of 2-methyl-5-nitro-3-indolyl acetic acid and 0.2 g. of p-toluenesulfonic acid. This slurry (which clears on heating) is heated to reflux under nitrogen. The water formed during the reaction is collected in a Stark and Dean tube. The reaction is stopped when the distillate is clear (about 2 hours). The excess benzyl alcohol is removed in vacuo. The residue is dissolved in benzene and washed with sodium bicarbonate followed by water, dried over anhydrous magnesium sulfate and concentrated in vacuo. The product is absorbed on 15 g. of acid washed alumina and chromatographed over 75 g. of acid washed alumina. The product is eluted with v./v. 1:1–3:1 ether-benzene. The eluate is evaporated and the combined product is crystallized from benzene-Skellysolve B. M.P. 147–148° C.

*Microanalysis.*—Calc. C, 66.66; H, 4.97; N, 8.64. Found: C, 66.83; H, 4.77; N, 8.52.

EXAMPLE 22

*Benzyl-(1-p-chlorobenzoyl-2-methyl-5-nitro-3-indolyl) acetate*

In a dry 125 ml. flask is placed 3.0 g. of benzyl-(2-methyl-5-nitro-3-indoyl) acetate in 60 ml. of dry dimethylformamide. To this solution, cooled to 0° C. in a nitrogen atmosphere is added 0.475 g. of 50% sodium hydride-mineral oil. This is stirred for 30 minutes. Then 1.65 g. of p-chlorobenzoyl in 10 ml. of dry dimethylformamide is added dropwise over a 5-minute period. The reaction mixture is stirred at 0° C. for 4 hours under a nitrogen atmosphere followed by stirring at room temperature under nitrogen overnight. It is then poured into an ice water-benzene mixture. The benzene layer is separated and the aqueous layer is washed with benzene. The combined benzene extracts are washed with sodium bicarbonate followed by water, dried with anhydrous sodium sulfate and concentrated in vacuo to dryness. The product is crystallized from benzene-Skellysolve B M.P. 166–167° C.

*Microanalysis.*—Calc. C, 64.86; H, 4.14; N, 6.05. Found: C, 64.78; H, 4.22; N, 5.91.

EXAMPLE 23

*Methyl-α-(1-p-chlorobenzoyl-2-methyl-5-amino-3-indolyl) propionate*

0.025 M of methyl-α-(1-p-chlorobenzoyl-2-methyl-5-nitro-3-indolyl) propionate in 100 ml. of ethanol is hydrogenated in the presence of 120 mg. of 10% palladium or charcoal catalyst at 40 p.s.i. at room temperature. After 0.075 M of hydrogen has been consumed, the hydrogenation is stopped, and the solution filtered to remove the catalyst. The filtrate is concentrated to dryness in vacuo to give methyl-α-(1-p-chlorobenzoyl-2-methyl-5-amino-3-indolyl) propionate.

EXAMPLE 24

*Methyl-α-[1-chlorobenzoyl-2-methyl-5-(N-methyl-acetamido)-3-indolyl] acetate*

Methyl-1-p-chlorobenzoyl-2-methyl-5-(N - methyl acet-amido-3-indolyl-acetate is added to a suspension of sodium hydride in dimethylformamide with stirring and ice-cooling. After one hour methyl iodide is added and the mixture is stirred overnight. The reaction mixture is poured into iced-water and extracted with ether. Evaporation of the ethereal solution and chromatography of the residual oil on an alumina column, using 15–25% (v./v.) ether in petroleum ether as the eluent, gives methyl 1-p-chlorobenzoyl - 2 - methyl-5-(N-methyl acet-amido)-3-indolyl acetate.

EXAMPLE 25

A. *Methyl-[1-p-chlorobenzoyl-2-methyl-5-bis-(β-hydroxyethyl)amino-3-indolyl] acetate*

A mixture of 0.02 mole of methyl-α-(1-p-chlorobenzoyl - 2 - methyl-5-amino-3-indolyl)propionate, 0.044 mole of ethylene oxide and 0.03 mole of acetic acid in 300 ml. dimethoxyethane is heated to 100° for 18 hours in an autoclave. The mixture is then diluted with water and filtered to yield crude methyl-[1-p-chlorobenzoyl-2-methyl - 5 - bis(β-hydroxyethyl)amino - 3 - indolyl]-propionate.

B. *Methyl-[1-p-chlorobenzoyl-2-methyl-5-(4'-methyl-1'-piperazinyl)-3-indolyl] acetate*

The product of A is stirred at 0° in pyridine with two mole proportions of p-toluenesulfonyl chloride until the reaction is substantially complete. The mixture is poured into water and the 5-bis(p-toluenesulfonyloxyethyl)amino compounds is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields methyl-[1-p-chlorobenzoyl-2-methyl-5-(4'-methyl-1'-piperazinyl)-3-indolyl] acetate.

Either of the above products, when used in the procedure of Example 7, gives the corresponding free acid.

EXAMPLE 26

*Methyl-[1-p-chlorobenzoyl-2-methyl-5-(4'-morpholinyl)-3-indolyl] acetate*

A solution of tosyl chloride (0.1 mole) in 200 ml. benzene is added dropwise with stirring to a solution of methyl-α-[1-p-chlorobenzoyl-2-methyl-5-bis(β-hydroxyethyl)amino-3-indolyl]acetate (0.1 mole) and pyridine (0.3 mole) in 300 ml. benzene at room temperature over a period of one hour. The mixture is then heated under reflux for 3 hours, washed with water, dried over sodium sulfate and evaporated to a syrup. Chromatography of the syrup on an alumina column using 30–50% (v./v.) ether in petroleum ether as the eluent gives methyl-[1-p-chlorobenzoyl - 2 - methyl-5-(4'-morpholinyl)-3-indolyl] acetate.

The above product, when used in the procedure of Example 7, gives the corresponding free acid.

EXAMPLE 27

A. *2-methyl-5-cyano-3-indolyl acetic acid methyl ester*

A solution of p-cyano phenylhydrazine (0.1 mole) and levulinic acid (0.1 mole) in 200 ml. concentrated hydrochloric acid is heated at 90° for 20 minutes and diluted with iced water (400 ml.). The crude product which separates is extracted with ether and chromatographed on a silica gel column to give 2-methyl-5-cyano-3-indolyl acetic acid using 20–50% (v./v.) ether and petroleum ether as the eluent.

The methyl ester is prepared by treatment with diazomethane in ether until the yellow of diazomethane persists and the mixture is evaporated.

B. *Methyl-α-(1-p-chlorobenzoyl-2-methyl-5-cyano-3-indolyl)acetate*

Alkylation of the ester (prepared in Example 26A above) in dimethylformamide with sodium hydride and p-chlorobenzoyl chloride, by the procedure of Example 2, gives methyl-(1 - p-chlorobenzoyl - 2 - methyl-5-cyano-3-indolyl) acetate.

C. *Methyl-α-(1-p-chlorobenzoyl-2-methyl-5-aminomethyl-3-indolyl)acetate*

The 5-cyano ester prepared in Example 27B is hydrogenated in ethanol in the presence of Raney nickel and 3 moles of anhydrous ammonia at 2000 p.s.i. at room temperature to give, after filtration of the catalyst and evaporation of the reaction mixture, methyl-(1-p-chlorobenzoyl-2-methyl-5-aminomethyl-3-indolyl)acetate which can be recrystallized from aqueous ethanol.

D. *Methyl-(1-p-chlorobenzoyl-2-methyl-5-dimethylaminomethyl-3-indolyl)acetate*

Treatment of the above α-aminomethyl indole with 2 moles of methyl iodide gives the 5-dimethylaminomethyl derivative.

E.

When the products of Examples 27C and 27D above are used in the procedure of Example 7, the corresponding free acids are obtained.

EXAMPLE 28

*α-(1-p-methylmercaptobenzoyl-2-methyl-5-methoxy-3-indolyl)-butyric acid*

When the procedure of Examples 1 and 2 are followed using ethyl α-ethyl levulinate in place of ethyl α-methyl levulinate, there is obtained successively ethyl α-(2-methyl-5-methoxy-3-indolyl)-butyrate and ethyl α-(1-p-methylmercaptobenzoyl-2-methyl-5-methoxy-3-indolyl)-butyrate. When the latter product is used in the procedure of Example 7 the corresponding butyric acid derivative is obtained.

The starting ethyl α-ethyl levulinate is prepared by alkylation of the sodio derivative of ethyl acetoacetate in ethanol with 1 m. of ethyl α-bromobutyrate, followed by hydrolysis and decarboxylation. The α-ethyl levulinic acid obtained is reesterified with 2 N ethanolic hydrogen chloride at reflux temperature for 18 hours.

EXAMPLE 29

*Ethyl-α-(1-benzoyl-2-methyl-5-methoxy-3-indolyl) acrylate*

500 ml. of dry ether, 36.02 g. of triphenylphosphonium bromide and 94.36 ml. of 1.10 N n-butyl lithium are stirred for 1 hour at room temperature under nitrogen. 38 g. of ethyl (2-methyl-5-methoxy-3-indolyl) glyoxylate in 260 ml. of benzene and 500 ml. of dry ether are added, and stirring continued for 1 hour. The reaction mixture is transferred to a pressure flask and heated in a closed flask at 65–70° C. for 5 hours. The liquid is poured from the pressure flask and the gum triturated with 500 ml. of 33% benzene in ether. The solutions are combined and washed with three 500 ml. portions of water, dried over sodium sulfate, filtered and concentrated in vacuo to a syrup. The syrup is slurried in benzene and charged onto a 200 g. column of activated alumina. Ethyl α-(2-methyl-5-methoxy-3-indolyl)-acrylate is eluted by washing the column with 30% ether in petroleum ether and removing the eluting solvents by evaporation.

The procedure of Example 13B is then followed using p-nitrophenylbenzoate in equivalent quantities in place of the p-nitrophenylisonicotinate, to give ethyl-α-(1-benzoyl-2-methyl-5-methoxy-3-indolyl)-acrylate.

EXAMPLE 30

*Ethyl-α-(1-benzoyl-2-methyl-5-methoxy-3-indolyl)-cyclopropyl carboxylate*

1.8 g. of ethyl α-(1-benzyl-2-methyl-5-methoxy-3-indolyl)-acrylate in 10 ml. of dry tetrahydrofuran is added to 4 g. of diiodomethane, 1.25 g. of zinc-copper couple and 0.2 g. of iodine in 20 ml. of dry tetrahydrofuran. The mixture is refluxed under nitrogen with stirring for 20 hours. The reaction mixture is then filtered, the filtrate added to ice water, and the whole extracted with three 50-ml. portions of ether. The combined ether extracts are washed with two 50-ml. portions of water, dried over sodium sulfate, filtered and concentrated. The syrup thus obtained is poured onto a 60 g. alumina column as a slurry in benzene. Ethyl α-(1-benzoyl - 2 - methyl-5-methoxy-3-indolyl) - cyclopropylcarboxylate is collected from the column by elution with 60% ether-petroleum ether.

EXAMPLE 31

The corresponding N–1 aroyl or heteroaroyl derivatives of benzyl - α - (2-methyl-5-methoxy-3-indolyl)propionate, benzyl-(2-methyl-5-methoxy-3-indolyl)acetate and benzyl-(2-methyl-5-nitro-3-indolyl)acetate are obtained by reacting these esters by the procedure of Example 13B with the p-nitrophenyl esters of the following acids, the p-nitrophenyl esters having been obtained from the acids by the procedure of Example 13A, using in each case the equivalent amount of the selected acid in place of the isonicotinic acid used in 13A and of its nitrophenyl ester used in 13B and equivalent quantities of the indolyl esters: 1-methylpyrryl-2-carboxylic acid, 5-methyl-pyrazole-3-carboxylic acid, 1,5-dimethyl-4-bromopyrazole-3-carboxylic acid, 1-phenylpyrazole-4-carboxylic acid, 1-phenyl-5-pyrazolone-3-carboxylic acid, 2-phenyl-5-methloxazole-4-carboxylic acid, isoxazole-3-carboxylic acid, 5-phenylisoxazole-3-carboxylic acid, 1,2-benzoisothiazole-3-carboxylic acid, 1,2,3-thiadiazole-4-carboxylic acid, 1-methyl-1,2,3-triazole-4-carboxylic acid, nicotinic acid, picolinic acid, isonicotinic acid-N-oxide, 3-chloroisonicotinic acid, 6-methoxynicotinic acid, 6-phenylnicotinic acid, α-pyrone-5-carboxylic acid, pyridazine-4-carboxylic acid, 3-keto-4-methyl-2-phenyl-2,3-dihydropyridazine-6-carboxylic acid, cinnoline-4-carboxylic acid, 2-methylmercapto-4-chloropyrimidine-5-carboxylic acid, 2,4-dichloropyrimidine-5-carboxylic acid, pyrazinoic acid, 5-methoxypyrazinoic acid, p-difluoromethoxy benzoic acid (prepared by the action of difluorochloromethane on the p-hydroxybenzoate of benzyl alcohol followed by hydrogenation of the benzyl group). The esters so obtained are converted to the free acids by the procedure of Example 7C.

EXAMPLE 32

*Ethyl-α-(1-p-chlorobenzoyl-2-methyl-5-ethoxy-3-indolyl) propionate*

The procedure of Example 1A is followed using an equivalent quantity of p-ethoxyphenylhydrazine hydrochloride in place of the methoxyphenylhydrazine to give ethyl-α-(2-methyl-5-ethoxy-3-indolyl)propionate. When this is used in the procedure of Example 3 there is obtained ethyl - α - (1-p-chlorobenzoyl-2-methyl-5-methoxy-3-indolyl)propionate. This product, when used in the procedure of Example 7, yields the corresponding free α-indolyl propionic acid.

Similarly, when p-propoxy and p-butoxy phenylhydrazine are used in the above procedures, the correspondingly 5-substituted indolyl acids are obtained.

When the procedure of Example 1A is followed using in place of the p-methoxyphenylhydrazine, equivalent amounts of p-ethylphenylhydrazine, p-butylphenylhydrazine and p-fluorophenylhydrazine (each obtainable by diazotization of the corresponding p-substituted aniline and reduction of the diazo) and the resultant indolyl ester is acylated by the procedure of Example 3 and further treated by the procedure of Example 7, the corresponding 5-substituted indolyl esters and acids are obtained.

When the procedure of Examples 1A, 3 and 7 are followed starting with phenylhydrazine, the corresponding 5-unsubstituted indolyl esters and acid are produced.

EXAMPLE 33

*1-benzoyl-2-methyl-5-methoxy-3-indolyl-acetamide*

To a suspension of 1.0 g. of 50% sodium hydride in 80 ml. benzene is added 4.4 g. of 2-methyl-5-methoxy-3-indolylacetamide with stirring. Twenty ml. of dimethylformamide is then added, followed by 2.8 g. benzoyl chloride twenty minutes later. The reaction mixture is stirred at room temperature for 1 hour and then poured into 400 ml. of ice and water. The precipitate is collected on a filter, M.P. 215–218°. The crude product is recrystallized from ethyl acetate twice, M.P. 219–220°. Its ultra violet absorption spectrum in ethanol shows maxima at $\lambda_{max}$ 2675 A., $E^{1\%}$, 406 and $\lambda_{max}$ 3160 A., $E^{1\%}$, 188.

*Microanalysis.*—Calc. for $C_{19}H_{16}N_2O_3$: C, 71.24; H, 5.03. Found: C, 71.00; H, 5.35.

EXAMPLE 34

*1-benzoyl-2-methyl-5-methoxy-3-indolyl-acetic acid*

To a solution of 3.2 g. of 1-benzoyl-2-methyl-5-methoxy-3-indolyl acetamide in 50 ml. dimethoxyethane containing 1 ml. of 12 N hydrochloric acid at 0° is added 0.7 g. of sodium nitrite with stirring. After gas evolution has subsided the mixture is poured into 200 ml. of iced water and the precipitate is extracted with methylene chloride. The methylene chloride solution is extracted with sodium bicarbonate solution. Acidification of the aqueous solution with 2 N hydrochloric acid precipitates the desired acid which is purified by recrystallization from benzene and from ethyl acetate-Skellysolve B.

EXAMPLE 35

The acylation procedures of Example 3 or of Example 12A are followed using various aromatic acyl chlorides in equivalent quantities in place of p-chlorobenzoyl chloride and using, as necessary, esters of 2-methyl-5-methoxy-3-indolyl acetic acid or of α-(2-methyl-5-methoxy-3-indolyl)propionic acid. Some of the resulting esters are converted to the corresponding free acid by the method of Example 7 or of 12B as indicated below. Where the method of Example 12B is used, the 1-acylation is by the process of Example 12A. The products obtained by these experiments are: (1 - p-methoxybenzoyl-2-methyl-5-methoxy-3-indolyl)acetic acid M.P. 88–89° C. (free acid by method of Example 7), α - (1-p-methoxybenzoyl-2-methyl-5-methoxy-3-indolyl)propionic acid M.P. 65° C. (free acid by method of Example 7), methyl-(1-p-bromobenzoyl-2-methyl-5-methoxy-3-indolyl) acetate M.P. 106–107.5° C., methyl-(1-p-nitrobenzoyl-2-methyl-5-methoxyl-3-indolyl) acetate M.P. 130–132° C., methyl-(1-o-chlorobenzoyl-2-methyl-5-methoxy-3-indolyl) acetate M.P. 91–93° C., methyl-(1-m-chlorobenzoyl-2-methyl-5-methoxy-3-indolyl) acetate M.P. 51–52° C., methyl-(1-p-phenylbenzoyl-2-methyl-5-methoxy - 3 - indolyl) acetate M.P. 101.5–103° C., methyl-(1-p-acetoxybenzoyl-2-methyl-5-methoxy-3-indolyl) acetate M.P. 99–101° C., ethyl-[1-(4 - thiazolylcarboxy) - 2 - methyl-5-methoxy-3-indolyl] acetate M.P. 76–82° C., ethyl-[1-(2-thenoyl)-2-methyl-5-methoxy-3-indolyl]acetate (oil), t-butyl-α-(1 - p - bromobenzoyl - 2-methyl-5-methoxy-3-indolyl)propionate M.P. 103–105° C., methyl-(1-α-naphthoyl-2-methyl-5-methoxy-3-indolyl) (oil), methyl-(1-p-benzyloxybenzoyl-2-methyl - 5 - methoxy - 3 - indolyl) acetate M.P. 116–118° C., methyl - (1 - p - hydroxybenzoyl - 2 - methyl - 5-methoxy - 3 - indolyl)acetate M.P. 155–158° C. (prepared from the p-benzyloxybenzoyl compound by catalytic hydrogenation over palladium), methyl - (1 - o-benzyloxybenzoyl-2-methyl-5-methoxy-3 - indolyl)acetate (not isolated—used to prepare next compound by catalytic hydrogenation over palladium), methyl-(1-o-hydroxybenzoyl-2-methyl-5-methoxy-3-indolyl) acetate (oil), methyl-(1 - o-fluorobenzoyl-2-methyl-5-methoxy-3-indolyl)acetate M.P. 98–99° C., [1-(2-thenoyl)-2-methyl-5-methoxy-3-indolyl] acetic acid M.P. 62° C. (method of Example 12), methyl - (1-β-naphthoyl-2-methyl-5-methoxy-3-indolyl)acetate M.P. 120–124° C., methyl-[1-(5-chloro-2-thenoyl)-2-methyl-5-methoxy-3-indolyl]acetate (oil), (1-p-trifluoromethylbenzoyl-2-methyl-5-indolyl)acetic acid M.P. 169–171° C. (method of Example 12), methyl [1-(2,6-dimethoxybenzoyl)-2-methyl-5-methoxy-3-indolyl] acetate M.P. 139.5–141° C., methyl [1-(o-p-dichlorobenzoyl)-2-methyl-5-methoxy-3-indolyl] acetate (oil).

EXAMPLE 36

The procedure of Example 1A is followed using an equivalent quantity of each of the following phenylhydrazines in place of the p-methoxyphenyl hydrazines: m-chlorophenylhydrazine, m-methoxyphenylhydrazine, p-fluorophenylhydrazine.

When the resulting indolyl acid is acylated by the procedure of Example 3, the corresponding 1-chlorobenzoyl indolyl acids are obtained.

EXAMPLE 37

Methyl-5-methoxy-3-indolylacetate is reduced at 4000 p.s.i. of hydrogen over nickel catalyst at room temperature. The resultant methyl-5-methoxy-2,3-dihydro-3-indolyl acetate is acylated by the procedure of Example 3 to give methyl-(1-p-chlorobenzoyl-5-methoxy-2,3-dihydro-3-indolyl)acetate. When this is stirred at room temperature in 100 times its weight of a 0.1 N solution of sodium hydroxide in 95% ethanol, the corresponding free acid is obtained.

EXAMPLE 38

*1-p-chlorobenzoyl-2-methyl-5-methoxy-2,3-dihydro-3-indolyl acetic acid*

A mixture of 3 g. of 10% palladium on charcoal in 75 ml. of glacial acetic acid is treated in a glass-lined bomb with hydrogen gas until the hydrogen uptake ceases. At this time 0.015 mole of 1-p-chlorobenzoyl-2-methyl-5-methoxy-3-indolyl-acetic acid is added and the temperature is raised to 80° C.

The reaction is stopped when the theoretical hydrogen uptake is reached, the mixture filtered, and the solvent removed in vacuo leaving a clear oil that solidifies on standing or on trituration with benzene. Fractional crystallization from benzene-petroleum ether removes a mixture of product and de-chlorinated product from unchanged starting material. Esterification with diazomethane of the reduced mixture and chromatography of the crude ester mixture on 150 g. of acid-washed alumina using ether-petroleum ether (v./v. 20–100%) as eluent gives the methyl ester of the product.

The ester is then dissolved in 60 ml. of methanol. An equimolar amount of sodium hydroxide in 5 ml. of water is added, and the resultant mixture stirred under nitrogen overnight. Excess water is then added, the solution filtered and washed with ether, made acidic with chloroform. The chloroform solution is washed with water, dried over anhydrous sodium sulfate, and concentrated in vacuo to give 1-p-chlorobenzoyl-2-methyl-5-methoxy-2,3-dihydro-3-indolylacetic acid.

When any of the other indole acids shown in Examples 1, 3, 5, 6, 7, 8, 9, 10, 12, 16, 17, 19, 20, 23, 24, 25, 26, 27C, 27D, 30, 32, 33 and 36 are used in this procedure, the corresponding indoline is obtained.

EXAMPLE 39

*1-p-trifluoromethylbenzoyl-2-methyl-5-methoxy-2,3-dihydro-3-indolylacetic acid*

Using the conditions set forth in Example 38, 1-p-trifluoromethylbenzoyl - 2 - methyl-5-methoxy-3-indolylacetic acid (0.015 mole) is reduced and the crude reduction mixture obtained is esterified with diazomethane. Chromatography of the crude esterification mixture on 150 g. of acid-washed alumina using ether-petroleum ether (v./v. 20–100%) as eluent gives the methyl ester of the product.

The ester is then dissolved in 60 ml. of methanol and an equimolar amount of sodium hydroxide in 5 ml. of water is added, and the resultant mixture stirred under nitrogen overnight. Excess water is then added, the solution filtered and washed with ether, made acidic with 2.5 N hydrochloric acid and extracted with chloroform. The chloroform solution is washed with water, dried over anhydrous sodium sulfate, and concentrated in vacuo to give 1 - p - trifluoromethylbenzoyl-2-methyl-5-methoxy-2,3-dihydro-3-indolylacetic acid.

EXAMPLE 40

*Methyl β-(3-indolinyl)-propionate hydrochloride*

A. *Methyl β-(3-indolyl)-propionate.*—A solution of β-3-indolyl propionic acid (0.132 mole) in 180 ml. of a 3% concentrated sulfuric acid-anhydrous methanol mixture is refluxed under nitrogen for three hours. After removal of the excess methanol in vacuo, 400 ml. of ether is added, and the ether solution washed with water, saturated sodium bicarbonate solution, water until neutral, and then dried over anhydrous sodium sulfate. The ether solution is then filtered, concentrated in vacuo to ca. 200 ml., and 400 ml. hexane added. After precipitation is complete, the mixture is filtered, the white crystals rinsed with petroleum ether and finally air dried to give an 84% yield of methyl β-(3-indolyl)-propionate, M.P. 78–80° C.

B. *Methyl β-(3-indolinyl)-propionate hydrochloride.*— A solution of methyl β-(3-indolyl)-propionate (0.116 mole) in 150 ml. methanol is hydrogenated in the presence of 25 g. of Raney nickel at room temperature for 48 hours under a hydrogen atmosphere of 3150 p.s.i.

The mixture is then filtered, concentrated in vacuo to ca. 50 ml., and added to 100 ml. anhydrous ether. To this ether solution is then added 200 ml. of a saturated anhydrous hydrogen chloride-ether solution, and the oily hydrochloride precipitates. The volume of the mixture is then adjusted to 500 ml., and stirred in an ice bath until the oil thickens. The ether solution is then decanted from the oil, an equal volume of fresh ether added, and the cooling and stirring repeated until solidification takes place. The mixture is then filtered, the light-pink to white solid rinsed with ether and then dried in vacuo to give methyl β-(3-indolinyl)-propionate hydrochloride.

EXAMPLE 41

*β-(1-p-chlorobenzoyl-2,3-dihydro-3-indolyl)-propionic acid*

A dry 50 ml. flask under a nitrogen atmosphere is charged with methyl β-(3-indolinyl)-propionate hydrochloride (0.008 mole) in 20 ml. of dry pyridine. The mixture is then cooled in an ice-water bath, and p-chlorobenzoyl chloride (0.009 mole) added with stirring. The mixture, containing precipitated pyridine hydrochloride, is then stirred for one hour. At this time, ca. 100 ml. of water is added to this mixture and the mixture extracted with ca. 100 ml. of ether. The ether layer is then washed with equal volumes of water, 2.5 N hydrochloric acid, water, saturated sodium bicarbonate solution, and finally water, and dried over anhydrous sodium sulfate. After filtering, the ether is removed in vacuo to give the methyl ester of the product. This is taken up in 30 ml. of methanol and treated with sodium hydroxide (0.008 mole) in 2.5 ml. of water at room temperature, overnight under a nitrogen atmosphere. To the solution is then added 150 ml. of water, and the basic aqueous solution extracted with 2 x 150 ml. of ether. The aqueous layer is then made acidic with 2.5 N hydrochloric acid, extracted with 2 x 150 ml. of ether, and the ether layer washed with 2 x 150 ml. of water and dried over anhydrous sodium sulfate. Filtering and concentration in vacuo of the ether solution gives β-(1-p-chlorobenzoyl-2,3-dihydro-3-indolyl)-propionic acid, M.P. 126–127.5° C. after recrystallization from benzene-petroleum ether.

EXAMPLE 42

*β-(1-p-methylbenzoyl-2,3-dihydro-3-indolyl)-propionic acid*

Following the acylation and saponification procedures set forth in Example 41, but using p-methylbenzoyl chloride in place of p-chlorobenzoyl chloride there is obtained β - (1 - p - methylbenzoyl - 2,3 - dihydro - 3 - indolyl)-propionic acid, M.P. 139–140° C. Methyl ester: M.P. 93.5–96° C.

EXAMPLE 43

Following the identical acylation and saponification procedures set forth in Example 41, but replacing the p-chlorobenzoyl chloride with
m-methylbenzoyl chloride,
o-methoxybenzoyl chloride,
m-methoxybenzoylchloride,
p-methoxybenzoylchloride,
o-chlorobenzoylchloride,
m-chlorobenzoylchloride,
p-trifluoromethylbenzoylchloride,
o-fluorobenzoylchloride,
m-fluorobenzoylchloride,
p-fluorobenzoylchloride,
p-methylthiobenzoyl chloride,
cinnamoyl chloride,
o,p-dichlorobenzoyl chloride,
α-thenoyl chloride,
nicotinoyl chloride,
phenyl chloroformate,
thiazole-4-carboxylic acid chloride,
3-furoyl chloride,
1-methylimidazole-5-carboxylic acid chloride,
1,3-dimethyl-2,3-dihydro-2-oxoimidazole-4-carboxylic acid chloride,
5-fluoro-2-thenoyl chloride,
3-thenoyl chloride,
5-nitro-2-furoylchloride,
1-methylindazole-3-carboxy chloride,
1-methyl-6-nitroimidazole-3-carboxy chloride,
oxazole-4-carboxy chloride,
benzoxazole-2-carboxy chloride,
thiazole-4-carboxy chloride,
thiazole-2-carboxy chloride,
2-phenylthiazole-4-carboxy chloride,
2-benzylmercaptothiazole-4-carboxy chloride,
p-cyanobenzoyl chloride,
p-trifluoromethylthiobenzoyl chloride,
p-methylsulfinylbenzoyl chloride,
p-methylsulfonylbenzoyl chloride,
p-benzylthiobenzoyl chloride,
p-mercaptobenzoyl chloride, and
p-nitrobenzoyl chloride,
there is obtained, respectively,
β-(1-m-methylbenzoyl-2,3-dihydro-3-indolyl)-propionic acid, M.P. 130–132° C.;
β-(1-o-methoxybenzoyl-2,3-dihydro-3-indolyl)-propionic acid;
β-(1-m-methoxy-benzoyl-2,3-dihydro-3-indolyl)-propionic acid, M.P. 149–151° C.;
β-(1-p-methoxybenzoyl-2,3-dihydro-3-indolyl)-propionic acid, M.P. 147–149° C.;

β-(1-o-chlorobenzoyl-2,3-dihydro-3-indolyl)-
propionic acid;
β-(1-m-chlorobenzoyl-2,3-dihydro-3-indolyl)-propionic
acid, M.P. 120–121° C.;
β-(1-p-trifluoromethylbenzoyl-2,3-dihydro-3-indolyl)
propionic acid;
β(1-o-fluorobenzoyl-2,3-dihydro-3-indolyl)propionic
acid, M.P. 98–100° C.;
β-(1-m-fluorobenzoyl-2,3-dihydro-3-indolyl)propionic
acid, M.P. 147–148° C.;
β-(1-p-fluorobenzoyl-2,3-dihydro-3-indolyl)propionic
acid, M.P. 143–144° C.;
β-(1-p-methylthiobenzoyl-2,3-dihydro-3-indolyl)
propionic acid;
β-(1-cinnamoyl-2,3-dihydro-3-indolyl)propionic acid,
M.P. 164–165° C.;
β-(1-o,p-dichlorobenzoyl-2,3-dihydro-3-indolyl)
propionic acid;
β-(1-α-thenoyl-2,3-dihydro-3-indolyl)propionic acid,
M.P. 154.5–155° C.;
β-(1-nicotinoyl-2,3-dihydro-3-indolyl)propionic acid,
β-(1-phenoxycarbonyl-2,3-dihydro-3-indolyl)
propionic acid,
β-(1-4-thiazolylcarbonyl-2,3-dihydro-3-indolyl)
propionic acid,
β-[1-(3-furoyl)-2,3-dihydro-3-indolyl]propionic acid,
β-[1-(1-methylimiazole-5-carboxy)-2,3-dihydro-3-
indolyl]propionic acid,
β-[1-1,3-dimethyl-2,3-dihydro-2-oxoimidazole-4-carboxy)-
2,3-dihydro-3-indolyl]propionic acid,
β-[1-(5-fluoro-2-thenoyl)-2,3-dihydro-3-indolyl]
propionic acid,
β-[1-(3-thenoyl)-2,3-dihydro-3-indolyl]propionic acid,
β-[1-(5-nitro-2-furoyl)-2,3-dihydro-3-indolyl]
propionic acid,
β-[1-(1-methylimidazole-3-carboxy)-2,3-dihydro-3-
indolyl]propionic acid,
β-[1-(1-methyl-6-nitroindazole-3-carboxy)-2,3-
dihydro-3-indolyl]propionic acid,
β-[1-(oxazole-4-carboxy)-2,3-dihydro-3-indolyl]
propionic acid,
β-[1-(benzoxazole-2-carboxy)-2,3-dihydro-3-indolyl]
propionic acid,
β-[1-(thiazole-4-carboxy)-2,3-dihydro-3-indolyl]
propionic acid,
β-[1-(thiazole-2-carboxy)-2,3-dihydro-3-indolyl]
propionic acid,
β-[1-(2-phenylthiazole-4-carboxy)-2,3-dihydro-3-
indolyl]propionic acid,
β-(1-p-cyanobenzoyl-2,3-dihydro-3-indolyl)
propionic acid,
β-(1-p-trifluoromethylthiobenzoyl-2,3-dihydro-3-indolyl)
propionic acid,
β-(1-p-methylsulfinylbenzyl-2,3-dihydro-3-indolyl)
propionic acid,
β-(1-p-benzylthiobenzoyl-2,3-dihydro-3-indolyl)
propionic acid,
β-(1-p-mercaptobenzoyl-2,3-dihydro-3-indolyl)
propionic acid, and
β-(1-p-nitrobenzoyl-2,3-dihydro-3-indolyl)propionic acid.

EXAMPLE 44

*β - (1 - N - phenylcarbamyl - 2,3 - dihydro -3 - indolyl) propionic acid*

To a solution of methyl β-(3-indolinyl)propionate (0.005 mole) in 5 ml. of anhydrous benzene is added phenylisocyanate (0.005 mole) in 5 ml. benzene. After a slight exothermic reaction has subsided, the mixture is stirred under nitrogen for 1 hour, at which time the benzene is removed in vacuo. The resultant oil is then chromatographed on a 60 g. silica gel column using ether-petroleum ether (v./v. 5–50%) as eluent. The ester obtained, M.P. 77–81° C., is then saponified with an equimolar aqueous-methanol sodium hydroxide solution as in Example 41 to give β-(1-N-phenylcarbamyl-2,3-dihydro-3-indolyl)propionic acid.

EXAMPLE 45

*Methyl β-(3-indolinyl)α-methylpropionate*

β-3-indolinyl-α-methylpropionic acid, M.P. 117–121° C., is prepared following the procedure for β-3-indolylpropionic acid. Following the esterification procedure of Example 41A is then obtained oily methyl β-3-indolinyl propionate in Example 40B. After removal of the solvent in vacuo, the residue is dissolved in ca. 250 ml. of ether and extracted with 2 x 200 ml. hydrochloric acid. The aqueous solution is then washed with 2 x 200 ml. ether, made slightly basic with concentrated ammonium hydroxide, and extracted with 2 x 200 ml. ether. The ether solution is then washed with 2 x 100 ml. water, dried over anhydrous potassium carbonate, filtered, and concentrated in vacuo to give methyl β-(3-indolinyl)α-methylpropionate.

EXAMPLE 46

*β - (1 - p - chlorobenzoyl - 2,3 - dihydro - 3 - indolyl)α-methylpropionic acid*

Following the complete acylation and saponification procedures set forth in Example 41, but using methyl β - 3 - indolinyl - α - methylpropionate instead of methyl β-3-indolinylpropionate there is obtained β-(1-p-chlorobenzoyl-2,3-dihydro-3-indolyl)α-methylpropionic acid.

Similarly, β - (1 - benzoyl - 2,3 - dihydro - 3 - indolyl)α-methyl propionic acid is obtained using benzoyl chloride in place of p-chlorobenzoyl chloride in the above acylation.

EXAMPLE 47

*Ethyl β-(3-indolinyl)β-methylpropionate*

Ethyl β-(3-indolinyl)β-methylpropionate is prepared via the published procedure for the corresponding 5,6-dimethoxy analog using, however, Raney nickel in place of the 10% palladium on carbon catalyst.

The reduction is then concentrated in vacuo to a gel-like substance which on trituration with ether partially crystallizes. After filtering and rinsing the solid material with ether, the filtrate and rinsings are concentrated in vacuo to a red oil. Chromatography of the oil on an acid washed alumina column (wt./wt. 1:30) with benzene as eluent gives ethyl β-(3-indolinyl)β-methylpropionate.

Reduction and work-up of reduction mixture is carried out as for the α-methyl analog (Example 45) gives ethyl β-(3-indolinyl)β-methylpropionate.

EXAMPLE 48

*β-(1-p-chlorobenzoyl-2,3-dihydro-3-indolyl)β-methylpropionic acid*

Following the complete acylation and saponification procedures set forth in Example 41, but using ethyl β-3-indolinyl β-methylpropionate in place of methyl β-3-indolinyl propionate there is obtained β-(1-p-chlorobenzoyl-2,3-dihydro-3-indolyl)β-methylpropionic acid.

Similarly, β-(1-benzoyl-2,3-dihydro-3-indolyl)β-methylpropionic acid is obtained using benzoyl chloride in place of p-chlorobenzoyl chloride in the above acylation.

EXAMPLE 49

*Methyl γ-(3-indolinyl)butyrate*

Methyl γ-3-indolylbutyrate is prepared from γ-3-indolylbutyric acid following the procedure used for methyl-β-3-indolylpropionate in Example 40A. Reduction and purification as set forth in Example 45 for methyl β-(3-indolinyl)α-methylpropionate gives methyl γ-(3-indolinyl)butyrate.

EXAMPLE 50

γ-(1-p-chlorobenzoyl-2,3-dihydro-3-indolyl)butyric acid

Following the complete acylation and saponification procedures set forth in Example 41, but using methyl γ-(3-indolinyl)-butyrate in place of methyl β-3-indolinyl-propionate gives γ-(1-p-chlorobenzoyl-2,3-dihydro-3-indolyl)-butyric acid.

EXAMPLE 51

1-p-chlorobenzoyl-2,3-dihydro-3-indolylacetic acid 3-indolylacetic acid is reduced and the resultant indoline reacted with p-chlorobenzoyl chloride via a Schotten-Baumann type acylation according to a literature procedure to give 1-p-chlorobenzoyl-2,3-dihydro-3-indolyl-acetic acid, M.P. 178° C. (from ethanol).

EXAMPLE 52

1-p-chlorobenzoyl-2,3-dimethyl-2,3-dihydro-3-indolylacetic acid

Following the procedures set forth in Example 41, ethyl 2,3-dimethyl-3-indolinyl-acetate is reacted with p-chlorobenzoyl chloride and the resultant compound saponified to give 1-p-chlorobenzoyl-2,3-dimethyl-2,3-dihydro-3-indolylacetic acid.

EXAMPLE 53

Methyl β-(5-methoxy-3-indolinyl)-propionate

A solution of methyl β-(5-methoxy-3-indolyl)-propionate (0.01 mole) in 25 ml. methanol is reduced under a hydrogen pressure of 2350–3200 p.s.i. at 100° C. in the presence of 3 g. of Raney nickel catalyst for 24 hours. The reduction mixture is filtered and concentrated in vacuo to an oil. The oil is dissolved in 200 ml. ether and the ether solution filtered and extracted with 2 x 200 ml. 2.5 N hydrochloric acid. The aqueous layer is washed with 2 x 200 ml. ether, made slightly alkaline with concentrated ammonium hydroxide, and extracted with 2 x 200 ml. ether. The ether layer is washed with 200 ml. portions of water until neutral to litmus paper, and dried over anhydrous potassium carbonate. Filtering and concentration in vacuo of the ether solution gives methyl β-(5-methoxy-3-indolinyl)propionate.

EXAMPLE 54

β-(1-p-chlorobenzoyl-5-methoxy-2,3-dihydro-3-indolyl)-propionic acid

Following the complete acylation and saponification procedures set forth in Example 41, but using methyl β-(5-methoxy-3-indolinyl)-propionate in place of methyl β-3-indolinyl-propionate there is obtained β-(1-p-chlorobenzoyl-5-methoxy-2,3-dihydro-3-indolyl)-propionic acid.

Similarly, β-(1-benzoyl-5-methoxy-2,3-dihydro-3-indolyl propionic acid, M.P. 179.5–181.5° C., is obtained using benzoyl chloride in place of p-chlorobenzoyl chloride in the above acylation.

EXAMPLE 55

β-(1-p-chlorobenzoyl-6-methoxy-2,3-dihydro-3-indolyl)-propionic acid

Following the procedures used for the 5-methoxy analog (Examples 53 and 54), methyl β-(6-methoxy-3-indolyl)-propionate is reduced, and the indoline derivative p-chlorobenzoylated and saponified to give β-(1-p-chlorobenzoyl-6-methoxy-2,3-dihydro-3-indolyl)-propionic acid.

EXAMPLE 56

β-(1-p-chlorobenzoyl-5,6-dimethoxy-2,3-dihydro-3-indolyl)-propionic acid

Following the procedures used for the monomethoxy analog (Examples 53 and 54), methyl β-(5,6-dimethoxy-3-indolyl)-propionate is reduced and the indoline derivative p-chlorobenzoylated and saponified to give β-(1-p-chlorobenzoyl - 5,6 - dimethoxy - 2,3 - dihydro - 3 - indolyl)-propionic acid.

EXAMPLE 57

Methyl β-(5-methyl-3-indolyl)-propionate

A dried 1 l. three neck flask equipped with a dropping funnel, mechanical stirrer and nitrogen inlet tube is charged with 170 ml. of anhydrous methanol, 0.17 mole anhydrous sodium acetate and 0.14 mole p-tolylhydrazine hydrochloride. The mixture is stirred under nitrogen for one half hour. γ-Formylbutyrate (0.16 mole) is added in one portion, and a slight exothermic reaction occurs. The mixture is aged for two hours. A solution of 21 g. of anhydrous hydrogen chloride in 140 ml. of anhydrous methanol is then added over twenty minutes, and the mixture gently refluxed under nitrogen for two and a quarter hours. After cooling, the mixture is filtered and the filtrate and methanol rinsings concentrated in vacuo to dryness. The residue is then taken up in 1 l. of ether, filtered, concentrated in vacuo to dryness, and partitioned between ca. 700 ml. chloroform and an equal volume of 2.5 N hydrochloric acid. The chloroform layer is then washed with another portion of dilute acid, then with an equal volume of saturated sodium bicarbonate solution, and finally with equal volumes of water until neutral. After drying over anhydrous potassium carbonate, the chloroform solution is concentrated to a small volume, charged into a 500 g. acid washed alumina column and eluted with ether to give methyl β-(5-methyl-3-indolyl)-propionate.

EXAMPLE 58

β-(1-p-chlorobenzoyl-5-methyl-2,3-dihydro-3-indolyl)-propionic acid

Following the procedures used for the 5-hydrogen-α-methyl analog (Examples 45, 40B and 46), methyl β-(5-methyl-3-indolyl)-propionate is reduced, and the indoline derivative purified, p-chlorobenzoylated and saponified to give β-(1-p-chlorobenzoyl - 5 - methyl-2,3-dihydro-3-indolyl)-propionic acid.

EXAMPLE 59

Methyl β-(5-fluoro-3-indolyl)-propionate

Following the procedure used in Example 57 for the 5-methyl analog but using p-fluorophenylhydrazine hydrochloride in place of p-methylphenylhydrazine hydrochloride, there is obtained methyl β-(5-fluoro-3-indolyl)-propionate.

EXAMPLE 60

Following the procedures used for the 5-hydrogen-α-methyl analog (Examples 8(3B) and 9), methyl β-(5-fluoro-3-indolyl)-propionate is reduced, and the indoline derivative purified, p-chlorobenzoylated and saponified to give β-(1-p-chlorobenzoyl - 5 - fluoro-2,3-dihydro-3-indolyl)-propionic acid.

EXAMPLE 61

Methyl β-(1-p-chlorobenzoyl-5-nitro-2,3-dihydro-3-indolyl)-propionate

Nitration of methyl β-(1-p-chlorobenzoyl-2,3-dihydro-3-indolyl)-propionate according to published procedures for N-benzoyl-5-nitroindoline and N-acetyl-5-nitroindoline, followed by chromatography on an acid-washed alumina column (wt./wt. 1:30) using ether-petroleum ether (v./v. 20–100%) gives methyl β-(1-p-chlorobenzoyl-5-nitro-2,3-dihydro-3-indolylpropionate.

EXAMPLE 62

β-(1-p-chlorobenzoyl-5-dimethylamino-2,3-dihydro-3-indolyl)-propionic acid

A. β-(1-p-chlorobenzoyl - 5 - nitro-2,3-dihydro-3-indolyl)-propionic acid.—Saponification of methyl β-(1-p-chlorobenzoyl - 5 - nitro-2,3-dihydro-3-indolyl)-propionate using the procedure in Example 41 gives β-(1-p-chlorobenzoyl-2,3-dihydro - 5 - nitro-3-indolyl)-propionic acid.

B. *β-(1-p-chlorobenzoyl - 5 - dimethylamino-2,3-dihydro-3-indolyl)propionic acid.*—A solution of β-(1-p-chlorobenzoyl - 5 - nitro-2,3-dihydro-3-indolyl)-propionic acid in 8 ml. of 1,2-dimethoxyethane, 0.5 ml. of glacial acetic acid and 0.5 ml. of 37% aqueous formaldehyde is reduced in the presence of platinum oxide at room temperature under a hydrogen pressure of 40 p.s.i. After filtering and removal of the solvent in vacuo the residue is spotted on several 8″ x 8″ thin-layer chromatography plates coated with Brinkman Silica-gel G and eluted ascendingly with a methanol-ethyl acetate solvent system to give β-(1-p-chorobenzoyl-5-dimethylamino-2,3-dihydro-3-indolyl)-propionic acid.

EXAMPLE 63

*β-(1-p-chlorobenzoyl-5-hydroxy-2,3-dihydro-3-indolyl)-propionic acid*

A. *Methyl β-(1-p-chlorobenzoyl - 5 - hydroxy-2,3-dihydro-3-indolyl)-propionate.*—Methyl β-(1-p-chlorobenzoyl-5-methoxy-2,3-dihydro-3-indolyl)-propionate (0.001 m.) is added slowly to excess pyridine hydrochloride at 160–220° C. After cooling, the mixture is partitioned between 500 ml. water and an equal volume of chloroform. The chloroform layer is washed with 2 x 150 ml. of 2.5 N hydrochloric acid, 150 ml. portions of water until the washings are neutral, and is then dried over anhydrous sodium sulfate. After filtering and concentration to a small volume, the chloroform solution is charged onto a 200 g. silica gel column and eluated with ether-petroleum ether (v./v. 10–70%) to give methyl β-1-p-chlorobenzoyl - 5 - hydroxy-2,3-dihydro-3-indolyl)-propionate and β-(1-p-chlorobenzoyl-5-hydroxy-2,3-dihydro-3-indolyl)-propionic acid.

B. *β-(1-p-chlorobenzoyl - 5 - hydroxy-2,3-dihydro-3-indolyl)-propionic acid.*—Following the saponification procedure set forth in Example 41, the above ester is treated with an aqueous-methanol solution of an equimolar amount of sodium hydroxide to give β-(1-p-chlorobenzoyl-5-hydroxy - 2,3 - dihydro-3-indolyl)-propionic acid.

EXAMPLE 64

*Methyl 2-phenyl-3-indolylacetate*

A dry 1 l. three-necked flask equipped with a thermometer, dropping funnel, mechanical stirrer and nitrogen inlet tube is charged with 150 ml. of anhydrous methanol and 0.145 mole of anhydrous sodium acetate. Phenylhydrazine hydrochloride (0.125 mole) is then added and the mixture aged thirty minutes under nitrogen. At this time 3-benzoylpropionic acid (0.142 mole) in 80 ml. of anhydrous methanol is added all at once and the mixture stirred for one half hour. Anhydrous hydrogen chloride (18 g.) in 125 ml. of anhydrous methanol is added over a period of twenty minutes, and the resultant mixture heated at a gentle reflux for two hours. After cooling, ca. 500 ml. of benzene is added, the mixture filtered, the residue rinsed with 500 ml. benzene, and the combined benzene solutions washed with 3 x 200 ml. 2.5 N hydrochloric acid, 200 ml. water, 3 x 200 ml. saturated sodium bicarbonate solution, 200 ml. portions of water until the washings are neutral, and the benzene layer dried over sodium sulfate anhydrous. After filtering and concentration in vacuo to a small volume the benzene solution is charged onto a 500 g. acid-washed alumina column and eluted with ether-petroluem ether (v./v. 10–50%) to give methyl 2-phenyl-3-indolyl acetate. The corresponding acid (M.P. 173–175° C.) is obtained by saponification.

EXAMPLE 65

*1-p-chlorobenzoyl-2-phenyl-2,3-dihydro-3-indolyl acetic acid*

A. *Methyl 2-phenyl - 3 - indolinylacetate.*—Methyl 2-phenyl-3-indolylacetate is reduced to the above indoline derivative using the published procedure for 2,3-dimethyl and 2,3-diphenylindoline.

B. *1-p-chlorobenzoyl - 2 - phenyl-2,3-dihydro-3-indolyl-acetic acid.*—Following the complete acylation and saponification procedures of Example 41, but using methyl 2-phenyl-3-indolinyl acetate in place of methyl β-(3-indolinyl)-propionate hydrochloride gives 1-p-chlorobenzoyl-2-phenyl-2,3-dihydro-3-indolylacetic acid.

EXAMPLE 66

*Sodium β - (1 - p-chlorobenzoyl-5-methoxy-2,3-dihydro-3-indolylpropionate*

β - 1 - p-chlorobenzoyl-5-methoxy-2,3-dihydro-3-indolyl propionic acid (0.01 mole) in 100 ml. ethanol is added to a solution of sodium hydroxide (0.01 mole) in 25 ml. water at room temperature. The mixture is stirred for a few minutes and then evaporated in vacuo to give sodium β - (1 - p - chlorobenzoyl - 5-methoxy-2,3-dihydro-3-indolylpropionate.

EXAMPLE 67

*β' - diethylaminoethyl β - (1-p-chlorobenzoyl-5-methoxy-2,3-dihydro-3-indolyl)-propionate*

Dicyclohexylcarbodiimide (0.0054 mole) in 6 ml. anhydrous tetrahydrofuran is added to a solution of β-(1-p-chlorobenzoyl - 5 - methoxy-2,3-dihydro-3-indolyl)-propionic acid (0.005 mole) and β-diethylaminoethanol (0.0052 mole) in 23 ml. anhydrous tetrahydrofuran and the mixture shaken vigorously for one minute. After sitting over a weekend, stoppered, the mixture is filtered to remove N,N'-dicyclohexylurea and ca. twenty drops of glacial acetic acid is added to decompose any remaining carbodiimide. After sitting two hours, the mixture is filtered, 250 ml. of ether is added, and the resulting solution extracted with 2 x 250 ml. 2.5 N hydrochloric acid. The combined acid extractions are washed with 2 x 250 ml. ether and then ice-bath cooled and made slightly alkaline with concentrated ammonium hydroxide. The aqueous mixture is then extracted with 2 x 250 ml. of ether, and the combined ether extractions washed with 10 x 200 ml. of water and dried over anhydrous potassium carbonate. After filtering, the ether is removed in vacuo to give β'-diethylaminoethyl β-(1-p-chlorobenzoyl-5-methoxy-2,3-dihydro-3-indolyl)-propionate.

When β-diethylaminoethanol in the above example is replaced by an equivalent amount of benzyl alcohol, phenol, p-chlorophenol and phenethyl alcohol the corresponding benzyl, phenyl, p-chlorophenyl and β-phenylethyl esters of β-(1-p-chlorobenzoyl-5-methoxy-2,3-dihydro-3-indolyl)-propionic acid are obtained.

EXAMPLE 68

*β-(1-p-chlorobenzoyl-5-methoxy-2,3-dihydro-3-indolyl)-propionmorpholide*

Isobutylchloroformate (0.0075 mole) is added to a stirred, ice-cooled solution of β-(1-p-chlorobenzoyl-5-methoxy-2,3-dihydro-3-indolyl)-propionic acid (0.0074 mole) and triethylamine (0.0075 mole) in 40 ml. of 1,2-dimethoxyethane. After stirring, cold, under a nitrogen atmosphere for 20 minutes, the mixture is suction filtered and the filtrate immediately set under nitrogen and ice-cooled again. At this time 0.008 mole of morpholine in 10 ml. of 1,2-dimethoxyethane is added, and the mixture stirred at ca. 5° C. overnight. The mixture is then poured into 250 ml. of chloroform and the chloroform solution washed with 2 x 200 ml. 2.5 N hydrochloric acid, 1 x 100 ml. water, 2 x 200 ml. saturated sodium bicarbonate solution, 200 ml. portions of water until the washings are neutral, and then dried over anhydrous sodium sulfate. Concentration in vacuo of the solution to a small volume followed by chromatography on a 100 g. acid-washed alumina column using ether-petroleum ether as eluent (v./v. 20–100%) gives β-(1-p - chlorobenzoyl - 5-methoxy-2,3-dihydro-3-indolyl)-propionmorpholide.

When morpholine in the above example is replaced by an equivalent amount of butylamine, β-hydroxyethylamine, diphenylamine, dibenzylamine, β-phenethylamine, aniline, m-trifluoromethylaniline and diethylamine, the corresponding amides of β-(1-p-chlorobenzoyl-5-methoxy-2,3-dihydro-3-indolyl)-propionic acid are thus obtained.

EXAMPLE 69

γ-(1-p-chlorobenzoyl-2,3-dihydro-3-indolyl)-α-aminobutyric acid

Methyl γ - (1 - p-chlorobenzoyl-2,3-dihydro-3-indolyl)-α-ketobutyrate (0.01 mole), prepared via a literature procedure for the corresponding des-chloro analog, hydroxylamine hydrochloride (0.02 mole), 200 ml. ethanol and 50 ml. pyridine are refluxed under nitrogen for six hours. After cooling, the mixture is concentrated in vacuo to ca. 50 ml. and poured into 1 l. of an ice-water mixture with vigorous stirring. After the ice melts, the aqueous layer is poured off the residue, the residue extracted with ca. 500 ml. ethyl acetate, and the ethyl acetate solution dried over anhydrous sodium sulfate. After filtering, the solvent is removed in vacuo, the residue taken up in 150 ml. of anhydrous methanol, and the solution reduced in the presence of 3 g. of 5% palladium on carbon at room temperature under a hydrogen pressure of 40 p.s.i. After filtering, the solution is concentrated in vacuo to ca. 25 ml., and 500 ml. of 2.5 N hydrochloric acid is added. The aqueous system is then washed with 3 x 150 ml. chloroform, made slightly alkaline with concentrated ammonium hydroxide, and extracted with 3 x 150 ml. chloroform. The combined chloroform extracts are then washed with 150 ml. portions of water until netural, dried over anhydrous potassium carbonate, filtered and the chloroform removed in vacuo to give methyl γ-(1-p-chlorobenzoyl-2,3-dihydro-3-indolyl)-α-aminobutyrate.

The above ester (0.001 mole) is suspended in 10 ml. of water with vigorous stirring, and potassium hydroxide (0.001 mole) in 2 ml. of water is added. When solution is obtained, the aqueous system is filtered and carefully neutralized with 1.25 N hydrochloric acid. Decantation of the aqueous phase followed by several water rinses and drying in a vacuum dessicator over anhydrous calcium chloride gives γ - (1 - p - chlorobenzoyl-2,3-dihydro-3-indolyl)-α-aminobutyric acid.

EXAMPLE 70

γ-(1-p-chlorobenzoyl-2,3-dihydro-3-indolyl)-α-methoxybutyric acid

Methyl γ - (1 - p-chlorobenzoyl-2,3-dihydro-3-indolyl)-α-hydroxybutyric acid (0.001 mole), prepared by reduction with sodium borohydride of the corresponding ketone (Example 69) via a literature procedure, methyl iodide (0.002 mole), sodium iodide (0.001 mole) and 3 g. anhydrous potassium carbonate in 40 ml. of methanol are greatly refluxed under nitrogen, the reaction mixture cooled, filtered and the methanol and excess methyl iodide removed in vacuo. The residue is triturated with 50 ml. ether, the ether solution filtered, concentrated in vacuo to ca. 10 ml., charged onto a 100 g. acid-washed alumina column and eluted with ether petroleum ether (v./v. 15–75°) to give methyl γ-(1-p-chlorobenzoyl-2,3-dihydro - 3 - indolyl)-α-methoxybutyrate. Saponification and purification of the above ester following the procedures set forth in Example 41 gives γ-(1-p-chlorobenzoyl-2,3-dihydro-3-indolyl)-α-methoxybutyric acid.

EXAMPLE 71

Ethyl 2-methyl-5-methoxy-2,3-dihydro-3-indolylacetate

A mixture of ethyl 2-methyl-5-methoxy-3-indolylacetate (0.077 mole) and 20 g. of mossy tin in 200 ml. of 6 N hydrochloric acid is heated under reflux for 18 hours. The solution is filtered and concentrated in vacuo to a volume of about 50 ml. Ethanol is added and the evaporation repeated in order to remove water. The residue is then treated with 200 ml. of 2 N ethanolic hydrogen chloride and the mixture refluxed for 18 hours. The solution is concentrated in vacuo to 50 ml., diluted with 300 ml. of water, and extracted with 200 ml. of ether. The aqueous solution is made alkaline with 2.5 N sodium hydroxide and filtered. The filtrate is extracted with 2 x 300 ml. of ether, washed with 100 ml. of water, dried over anhydrous potassium carbonate, filtered and evaporated in vacuo to give ethyl 2 - methyl - 5-methoxy-2,3-dihydro-3-indolylacetate.

EXAMPLE 72

Ethyl 1-benzoyl-5-methoxy-2-methyl-2,3-dihydro-3-indolylacetate

To a solution of 0.007 mole of ethyl 5-methoxy-2-methyl-2,3-dihydro-3-indolyl acetate in 20 ml. of pyridine is added 3 ml. of benzoyl chloride with ice cooling and stirring. After 2 hours in the ice-bath the reaction mixture is allowed to stand at room temperature for 4 hours. The mixture is then poured into 100 ml. of iced-water and extracted with 2 x 100 ml. ether. The ethereal solution is washed with 2 x 100 ml. water, dilute hydrochloric acid, dilute sodium bicarbonate and water successively and dried over sodium sulfate. Evaporation of the solvent and recrystallization of the residual solid from benzene-Skellysolve B gives ethyl 1-benzoyl-5-methoxy-2-methyl-2,3-dihydro-3-indolylacetate, M.P. 85.5–86.5° C. U.V. absorption: $\lambda_{max}$. 2420, 2720, E% 222, 317.

EXAMPLE 73

1-benzoyl-5-methoxy-2-methyl-2,3-dihydro-3-indolyl acetic acid

The ethyl ester of the above acid is dissolved in a mixture of 18 ml. ethanol and 2 ml. 11 N sodium hydroxide at room temperature. After standing for 18 hours the solution is concentrated in vacuo to ca. ½ volume, diluted with water and extracted with ether to remove any neutral material. The aqueous solution is acidified with dilute hydrochloric acid and then extracted with ether. The ether solution is dried over sodium sulfate and evaporated to dryness. The residue is recrystallized from benzene-Skellysolve B, M.P. 185–186° C.

EXAMPLE 74

6.5 g. (0.02 mole) of β-(1-benzoyl-2,3-dihydro-3-indolyl) propionic acid is added to 50 ml. of water which has been flushed with nitrogen. The slurry is stirred under nitrogen and 20 ml. of 1.05 N sodium carbonate added with stirring. When a clear solution is obtained, a solution of 2.2 g. of $Al_2(SO_4)_3 \cdot 18H_2O$ in 8 ml. of water is added with vigorous stirring. The mixture is stirred until it is homogenous and the solid aluminum salt of (1-benzoyl-2,3-dihydro-3-indolyl) propionic acid, is recovered by filtration and washed with water and with ethanol.

In a similar fashion, there may be prepared the sodium and aluminum salts as well as other salts, such as the potassium, iron and magnesium salts, of the various (3-indolyl)aliphatic acids described in the accompanying examples.

I claim:

1. A method of treating inflammation and fever due to inflammation, in patients, which comprises orally administering, to said patients, 1.0–4000 mg. per day of a compound of the structure

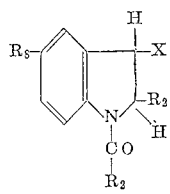

wherein:
 $R_1$ is halophenyl;
 $R_2$ is selected from the group consisting of hydrogen and lower alkyl;
 X is selected from the group consisting of α-propionic acid, β-propionic acid and acetic acid;
 $R_3$ is selected from the group consisting of hydrogen and lower alkoxy.

2. The method of claim 1 in which the compound is β-(1-benzoyl-5-methoxy-3-indolinyl)propionic acid.

3. The method of claim 1 in which the compound is 1-p-chloro benzoyl-2-methyl-5-methoxy-3-indolinyl acetic acid.

4. The method according to claim 1 in which the compound is α-[1-p-chlorobenzoyl-2-methyl-5-methoxy-3-indolinyl]propionic acid.

References Cited by the Examiner
UNITED STATES PATENTS

| | | | |
|---|---|---|---|
| 2,994,640 | 8/1961 | Zellner | 167—65 |
| 3,006,812 | 10/1961 | Wallace | 167—65 |
| 3,047,585 | 7/1962 | Johnson | 260—319 |
| 3,075,993 | 1/1963 | Chemerda et al. | 260—319 |
| 3,161,654 | 12/1964 | Shen | 167—65 |

OTHER REFERENCES

British Med. J., vol. 2, No. 5402, page 429, August 1964. Chemical Abstracts 58: 11314c (1963).

SAM ROSEN, *Primary Examiner.*

NICHOLAS S. RIZZO, *Examiner.*

MARY U. O'BRIEN, JEROME D. GOLDBERG,
 *Assistant Examiners.*